United States Patent
Tsukada et al.

(10) Patent No.: US 10,899,099 B2
(45) Date of Patent: Jan. 26, 2021

(54) DEVICE AND METHOD FOR EVALUATING OPERATING CONDITIONS OF BRIQUETTING MACHINE, BRIQUETTING MACHINE, METHOD FOR MANUFACTURING BRIQUETTE, CONTROL DEVICE OF BRIQUETTING MACHINE, CONTROL METHOD OF BRIQUETTING MACHINE, AND PROGRAM

(71) Applicants: FURUKAWA INDUSTRIAL MACHINERY SYSTEMS CO., LTD., Tokyo (JP); FURUKAWA CO., LTD., Tokyo (JP)

(72) Inventors: Koji Tsukada, Tochigi (JP); Yu Kuronuma, Ibaraki (JP)

(73) Assignees: FURUKAWA INDUSTRIAL MACHINERY SYSTEMS CO., LTD., Tokyo (JP); FURUKAWA CO., LTD., Tokyo (JP)

( * ) Notice: Subject to any disclaimer, the term of this patent is extended or adjusted under 35 U.S.C. 154(b) by 716 days.

(21) Appl. No.: 15/520,511

(22) PCT Filed: Oct. 21, 2015

(86) PCT No.: PCT/JP2015/079664
§ 371 (c)(1),
(2) Date: Sep. 27, 2017

(87) PCT Pub. No.: WO2016/063897
PCT Pub. Date: Apr. 28, 2016

(65) Prior Publication Data
US 2018/0036981 A1 Feb. 8, 2018

(30) Foreign Application Priority Data
Oct. 23, 2014 (JP) .................. 2014-216163

(51) Int. Cl.
*B30B 11/00* (2006.01)
*B30B 15/26* (2006.01)
(Continued)

(52) U.S. Cl.
CPC ............... *B30B 11/006* (2013.01); *B01J 2/22* (2013.01); *B30B 15/26* (2013.01); *B30B 11/16* (2013.01);
(Continued)

(58) Field of Classification Search
CPC ....................................... B30B 11/006
(Continued)

(56) References Cited

U.S. PATENT DOCUMENTS 5,815,397 A 9/1998 Saito et al.
2013/0197684 A1 8/2013 Oomuro
(Continued)

FOREIGN PATENT DOCUMENTS

JP 62279835 A2 12/1987
JP 5132387 A2 5/1993
(Continued)

OTHER PUBLICATIONS

Lin X, Cassandras CG. An optimal control approach to the multi-agent persistent monitoring problem in two-dimensional spaces. IEEE Transactions on Automatic Control. Sep. 24, 2014;60(6):1659-64. (Year: 2014).*

(Continued)

*Primary Examiner* — Galen H Hauth
(74) *Attorney, Agent, or Firm* — Rankin, Hill & Clark LLP

(57) ABSTRACT

An evaluation device (20) evaluates the operating conditions of a briquetting machine (10). The evaluation device (20) includes an evaluation information acquisition unit (220) and an evaluation data generation unit (230). The evaluation
(Continued)

information acquisition unit (220) acquires a plurality of pieces of evaluation information indicating the evaluation results of a plurality of briquettes manufactured under the same manufacturing conditions by the briquetting machine (10). The evaluation data generation unit (230) generates evaluation data that is data obtained by comparing a plurality of pieces of evaluation information with each other.

10 Claims, 14 Drawing Sheets

(51) Int. Cl.
    *B01J 2/22*     (2006.01)
    *B30B 11/16*     (2006.01)
    *B30B 15/00*     (2006.01)
    *B30B 15/30*     (2006.01)

(52) U.S. Cl.
    CPC ......... *B30B 15/0005* (2013.01); *B30B 15/308* (2013.01)

(58) Field of Classification Search
    USPC .......................................................... 700/51
    See application file for complete search history.

(56) References Cited

U.S. PATENT DOCUMENTS

| | | | | |
|---|---|---|---|---|
| 2014/0007784 | A1* | 1/2014 | Gamlen | B30B 11/005 100/50 |
| 2014/0144073 | A1* | 5/2014 | Sunaga | B30B 11/006 44/634 |
| 2014/0146310 | A1 | 5/2014 | Yuasa | |

FOREIGN PATENT DOCUMENTS

| | | | |
|---|---|---|---|
| JP | 5293357 | A2 | 11/1993 |
| JP | 623745 | | 2/1994 |
| JP | 7246325 | A2 | 9/1995 |
| JP | 8118443 | A2 | 5/1996 |
| JP | 9278534 | | 10/1997 |
| JP | 2001062280 | A2 | 3/2001 |
| JP | 2003114713 | A2 | 4/2003 |
| JP | 2003171721 | A | 6/2003 |
| JP | 2004217467 | A2 | 8/2004 |
| JP | 2009021348 | A2 | 1/2009 |
| JP | 2009222610 | A | 10/2009 |
| JP | 2011113195 | A2 | 6/2011 |
| JP | 2012063928 | A1 | 3/2012 |
| JP | 2013156708 | A2 | 8/2013 |
| JP | 2014104411 | A1 | 6/2014 |
| JP | 2014106084 | | 6/2014 |
| JP | 2014179060 | A2 | 9/2014 |
| WO | 2009116543 | A1 | 9/2009 |

OTHER PUBLICATIONS

MacGregor, John F., and Theodora Kourti. "Statistical process control of multivariate processes." Control Engineering Practice 3, No. 3 (1995): 403-414. (Year: 1995).*

Bersimis et al., "Multivariate statistical process control charts and the problem of interpretation: a short overview and some applications in industry." In Proceedings of the 7th Hellenic European Conference on Computer Mathematics and its Applications, Athens Greece. 2005. (Year: 2005).*

Sugimoto M. et al., "The Simultaneous Operation of Granulation, Grinding and Separation in a Continuous Tumbling Conical Granulator—On the Shape Evaluation of the Granules and Granulating Conditions," 1993, p. 563-569, vol. 30 No. 8; Cited in Japanese OA; English abstract.

Office Action dated Apr. 24, 2018 for the corresponding Japanese Patent Application No. 2016-555246.

International Search Report dated Jan. 26, 2016 filed in PCT/JP2015/079664.

Sekiguchi, Isao, "Granulation Techniques for Controlling Forms of Particulate Materials," Japanese Journal of Multiphase Flow, Nov. 3, 1997, p. 362-369, vol. 11 No. 4, J-Stage. English Abstract included.

Japanese office action dated Nov. 21, 2017 of corresponding Japanese patent application No. 2016-555246.

"Regarding the revision of guidelines about pharmaceutical development", Jun. 28, 2010, and its partial English translation; Cited in Information Statements filed in JP2016-555246.

* cited by examiner

DEVICE AND METHOD FOR EVALUATING OPERATING CONDITIONS OF BRIQUETTING MACHINE, BRIQUETTING MACHINE, METHOD FOR MANUFACTURING BRIQUETTE, CONTROL DEVICE OF BRIQUETTING MACHINE, CONTROL METHOD OF BRIQUETTING MACHINE, AND PROGRAM

TECHNICAL FIELD

The present invention relates to a device and method for evaluating the operating conditions of a briquetting machine, a briquetting machine, a method for manufacturing a briquette, a control device of a briquetting machine, a control method of a briquetting machine, and a program.

BACKGROUND ART

There is a method of manufacturing a briquette (briquette) by applying compressive force to a raw material. In the manufacturing of a briquette, it is required to stabilize the quality of the manufactured briquette.

Patent Document 1 discloses a technique for controlling the operating conditions of an apparatus based on the value of distortion occurring in a compression roller support portion, which applies compressive force to a raw material, so that briquettes can be manufactured under the desired granulation conditions. By measuring the value of distortion to directly ascertain the compressive load applied to the raw material, the operating conditions are precisely controlled.

RELATED DOCUMENT

Patent Document

[Patent Document 1] Japanese Unexamined Patent Publication No. 2001-62280

SUMMARY OF THE INVENTION

Even under the same operating conditions, the quality of the briquette changes depending on the state of the raw material, the humidity at the time of manufacturing, and the like. For this reason, in the method disclosed in Patent Document 1, in a case where the briquette manufactured under the predetermined operating conditions deviates from desired quality, it has been difficult to determine how to adjust the operating conditions of the briquetting machine.

The present invention makes it easy to determine how to adjust the operating conditions of a briquetting machine when bringing the quality of the briquette close to the target quality.

According to the present invention, there is provided an evaluation device for evaluating operating conditions of a briquetting machine. The evaluation device includes: an evaluation information acquisition unit that acquires a plurality of pieces of evaluation information indicating evaluation results of a plurality of briquettes manufactured under the same manufacturing conditions by the briquetting machine; and an evaluation data generation unit that generates evaluation data that is data obtained by comparing the plurality of pieces of evaluation information with each other.

According to the present invention, there is provided an evaluation method for evaluating operating conditions of a briquetting machine. The evaluation method includes: acquiring a plurality of pieces of evaluation information indicating evaluation results of a plurality of briquettes manufactured under the same manufacturing conditions by the briquetting machine; and generating and displaying evaluation data that is data obtained by comparing the plurality of pieces of evaluation information with each other. The evaluation data is display data for displaying the plurality of pieces of evaluation information on the same graph in a state in which the plurality of pieces of evaluation information can be distinguished from each other.

According to the present invention, there is provided a computer program for realizing an evaluation device for evaluating operating conditions of a briquetting machine. The computer program causes a computer to function as: an evaluation information acquisition unit that acquires a plurality of pieces of evaluation information indicating evaluation results of a plurality of briquettes manufactured under the same manufacturing conditions by the briquetting machine; and an evaluation data generation unit that generates evaluation data that is data obtained by comparing the plurality of pieces of evaluation information with each other.

According to the present invention, there is provided a briquetting machine including: a granulation unit that operates under set operating conditions to manufacture briquettes; an acquisition unit that acquires evaluation information indicating evaluation results of the plurality of briquettes manufactured under the same manufacturing conditions; and a setting unit that sets the operating conditions based on the evaluation information. The evaluation information includes a first evaluation parameter and a second evaluation parameter. The setting unit determines whether or not to change the operating conditions set in advance by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

According to the present invention, there is provided a control device of a briquetting machine that operates under set operating conditions to manufacture briquettes. The control device of a briquetting machine includes: an acquisition unit that acquires evaluation information indicating evaluation results of the plurality of briquettes manufactured under the same manufacturing conditions; and a setting unit that sets the operating conditions based on the evaluation information. The evaluation information includes a first evaluation parameter and a second evaluation parameter. The setting unit determines whether or not to change the operating conditions set in advance by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

According to the present invention, there is provided a control method of a briquetting machine that operates under set operating conditions to manufacture briquettes. The control method of a briquetting machine includes: an acquisition step of acquiring evaluation information indicating evaluation results of the plurality of briquettes manufactured under the same manufacturing conditions; and a setting step of setting the operating conditions based on the evaluation information. The evaluation information includes a first evaluation parameter and a second evaluation parameter. In the setting step, whether or not to change the operating conditions set in advance is determined by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

According to the present invention, there is provided a method of manufacturing briquettes using a briquetting machine. The method of manufacturing briquettes includes: an acquisition step of acquiring evaluation information indicating evaluation results of the plurality of briquettes manufactured under the same manufacturing conditions; and a setting step of setting the operating conditions based on the evaluation information. The evaluation information includes a first evaluation parameter and a second evaluation parameter. In the setting step, whether or not to change the operating conditions set in advance is determined by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

According to the present invention, there is provided a computer program for realizing a control device of a briquetting machine that operates under set operating conditions to manufacture briquettes. The computer program causes a computer to function as: an acquisition unit that acquires evaluation information indicating evaluation results of the plurality of briquettes manufactured under the same manufacturing conditions; and a setting unit that sets the operating conditions based on the evaluation information. The evaluation information includes a first evaluation parameter and a second evaluation parameter. The setting unit determines whether or not to change the operating conditions set in advance by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

According to the present invention, it is possible to facilitate the adjustment of the operating conditions of the briquetting machine for bringing the quality of the obtained briquette close to the target quality.

BRIEF DESCRIPTION OF THE DRAWINGS

The above-described object and other objects, features, and advantages will become more apparent by preferred embodiments described below and the following accompanying diagrams.

DESCRIPTION OF EMBODIMENTS

Figure 1:
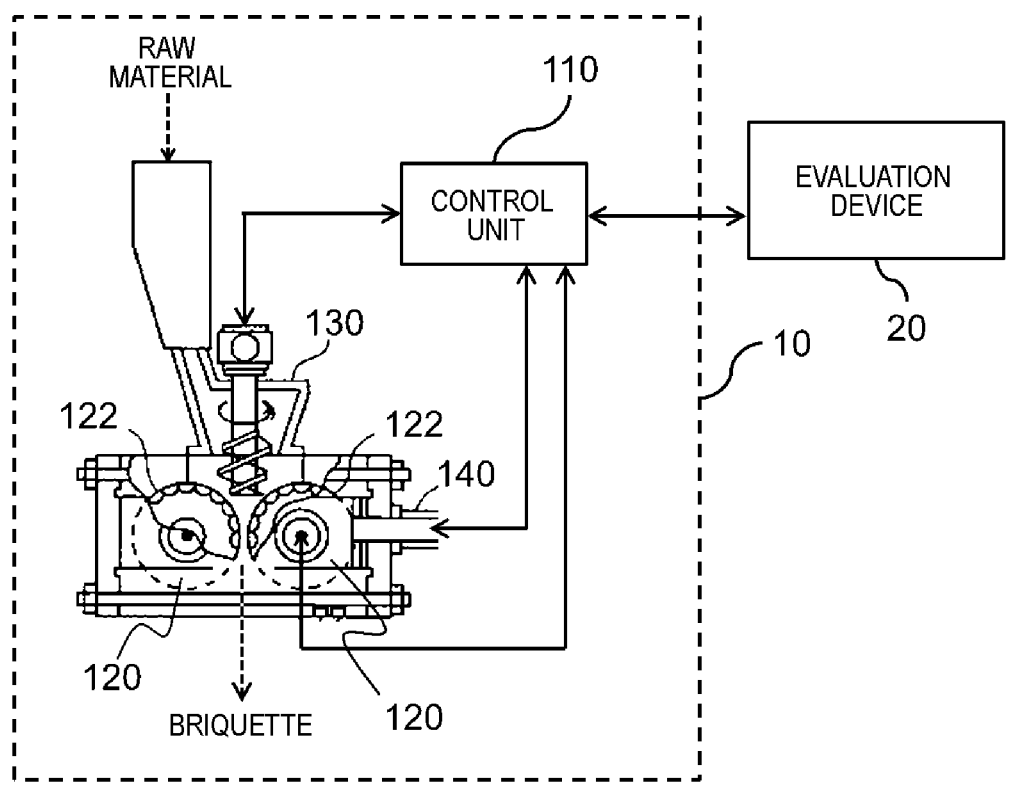
FIG. 1 is a diagram illustrating the use environment of an evaluation device according to a first embodiment.

Hereinafter, embodiments of the present invention will be described with reference to the diagrams. In all diagrams, the same components are denoted by the same reference numerals, and the explanation thereof will not be repeated.

In the following explanation, a control unit, a setting unit, a storage unit, and an acquisition unit of a briquetting machine and an evaluation information acquisition unit and an evaluation data generation unit of an evaluation device show not the configuration of a hardware unit but the block of a functional unit. The control unit, the setting unit, the storage unit, and the acquisition unit of the briquetting machine and the evaluation information acquisition unit and the evaluation data generation unit of the evaluation device are realized by any combination of hardware and software based on a CPU, a memory, a program for realizing the components in this diagram that is loaded onto the memory, storage media such as a hard disk for storing the program, and an interface for network connection of any computer. There are various modification examples of the implementation method and apparatus.

First Embodiment

Figure 2:
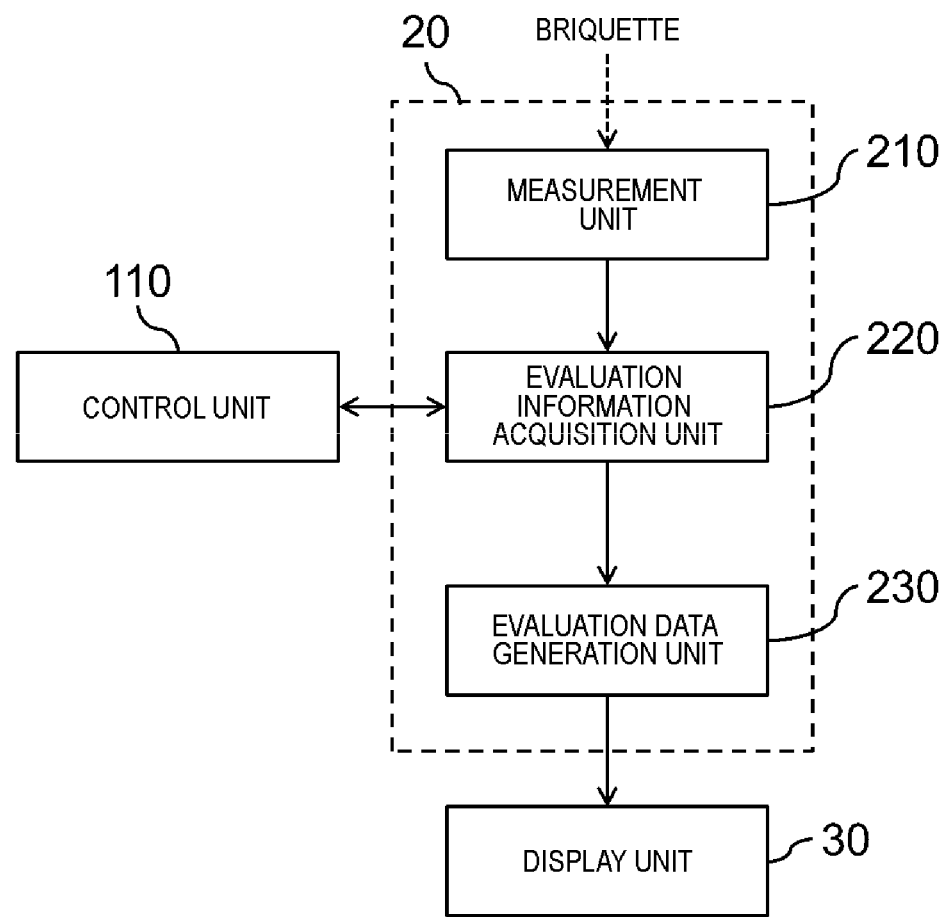
FIG. 2 is a block diagram showing the configuration of the evaluation device.

FIG. 1 is a diagram illustrating the use environment of an evaluation device 20 according to a first embodiment. FIG. 2 is a block diagram showing the configuration of the evaluation device 20. Hereinafter, the flow of data is indicated by solid arrows, and the flow of an object is indicated by dotted arrows.

A briquetting machine 10 manufactures a briquette by compressing a raw material. The quality of the briquette changes depending on the operating conditions of the briquetting machine 10.

The evaluation device 20 evaluates the operating conditions of the briquetting machine 10. The evaluation device 20 includes an evaluation information acquisition unit 220 and an evaluation data generation unit 230. The evaluation information acquisition unit 220 acquires a plurality of pieces of evaluation information indicating the evaluation results of a plurality of briquettes manufactured under the same manufacturing conditions by the briquetting machine 10. The evaluation data generation unit 230 generates evaluation data that is data obtained by comparing a plurality of pieces of evaluation information with each other. Detailed explanation thereof will be given below.

First, the structure of the briquetting machine 10 according to the present embodiment will be described with reference to FIG. 1. The briquetting machine 10 includes a control unit 110, two rolls 120, a raw material supply unit 130, and a pressure adjustment unit 140. The two rolls 120 face each other. A recessed portion is formed on at least one of the surfaces of the two rolls 120, so that a raw material is compressed between the two rolls 120 to manufacture a briquette. The raw material supply unit 130 is provided above a gap between the two rolls 120 so that a raw material is supplied to the gap. The raw material supply unit 130 supplies a raw material between the two rolls 120. The raw material supply unit 130 includes, for example, a raw material hopper for storing a raw material and a screw feeder for supplying the raw material between the two rolls 120.

The two rolls 120 are arranged with their curved surface portions 122 facing each other, and the distance between the two rolls 120, that is, the distance between the curved surface portions 122 is variable. The pressure adjustment unit 140 adjusts the pressure applied to the raw material, which is located between the two rolls 120, through the two rolls 120. The pressure adjustment unit 140 is provided on one of the rolls 120, and the roll 120 adjusts the pressure with which the roll 120 is pressed against the other roll 120. The pressure adjustment unit 140 is, for example, a hydraulic device.

The briquetting machine 10 further includes the control unit 110. The control unit 110 is, for example, a microcontroller (microcomputer). The briquetting machine 10 further includes an input unit (not shown in the drawings), and the control unit 110 controls the operating conditions based on the set value input from the user or an external device. Specifically, the control unit 110 controls the rotation direction and rotation speed of the roll 120. By the control, the two rolls 120 are simultaneously driven to rotate in opposite directions at the same rotation speed. At this time, the directions of rotation of the two rolls 120 are directions in which the two curved surface portions 122 move away from the raw material supply unit 130 in a region where the two curved surface portions 122 face each other. For example, in FIG. 1, the right roll 120 rotates counterclockwise, and the left roll 120 rotates clockwise. Accordingly, the raw material in the gap between the two curved surface portions 122 is sent out to a side opposite to the raw material supply unit 130 while being compressed. The control unit 110 controls the pressure adjustment unit 140 to adjust the pressure applied between the two rolls 120. The control unit 110 controls the raw material supply unit 130 to adjust the amount of raw material (raw material supply amount) supplied between the two rolls 120. In a specific example, the raw material supply amount can be adjusted by controlling the rotation speed of the screw feeder.

The raw material supply unit 130 is not limited to the configuration described above. For example, a gate feeder may be provided instead of the screw feeder, or no feeder may be provided. In a case where the raw material supply unit 130 includes a gate feeder, it is possible to adjust the raw material supply amount based on the amount of opening of the gate. On the other hand, in a case where no feeder is provided, it is possible to adjust the raw material supply amount by controlling the amount of raw material to be stored in the raw material hopper.

The briquetting machine 10 may further include a sensor for measuring the state of the raw material. The state of the raw material to be measured herein is, for example, the temperature of the raw material or the amount of moisture of the raw material. The control unit 110 acquires a measurement result from the sensor as information regarding the raw material. The briquetting machine 10 may further include a sensor for measuring the state of the environment where the briquetting machine 10 is placed. The state of the environment to be measured herein is, for example, humidity. The control unit 110 acquires a measurement result from the sensor as information regarding the environment. The control unit 110 gives briquette identification information, for example, a lot number, to the information regarding the raw material and the information regarding the environment for each lot.

As described above, the raw material supplied to the briquetting machine 10 is supplied between the two rolls 120 by the raw material supply unit 130, and is compressed. In at least one of the rolls 120, a plurality of recessed portions are provided on the surface for compressing the raw material, and the general shape of a briquette to be manufactured is determined according to the shapes of the recesses. The compressed raw material is sent to the side opposite to the raw material supply unit 130 by the rotation of the roll 120, thereby obtaining a briquette.

The thickness of the briquette is determined by the distance between the two rolls 120. Here, the distance between the two rolls 120 is variable, and depends on the pressure adjusted by the pressure adjustment unit 140, the amount of raw material supplied by the raw material supply unit 130, the rotation speed of the roll 120, and the like. Specifically, the distance between the two rolls 120 to which predetermined pressure is applied increases according to the balance between the raw material supply amount and the rotation speed. Accordingly, the thickness of the briquette decreases as the pressure increase, decreases as the rotation speed of the roll 120 increases, and increases as the raw material supply amount increases. Therefore, the operating conditions of the briquetting machine 10 when granulating the raw material include, for example, the rotation speed of the two rolls 120, pressure applied to the raw material located between the two rolls 120 through the two rolls 120, and a raw material supply amount per unit time of the raw material supply unit 130. In addition to the rotation speed of the rolls 120, the rotation speed of the screw feeder or the like of the raw material supply unit 130, the pressure of the pressure adjustment unit 140, and the like that are directly controlled to become set values by the control unit 110, the operating conditions may also include conditions that are indirectly controlled to become specific set values by adjusting these. That is, the operating conditions may include a raw material supply amount, consumption current, power consumption, the amount of movement of the roll 120, and a value of distortion occurring in the support portion of the roll 120, and the like. Here, the amount of movement of the roll 120 is a magnitude by which each roll 120 moves from the initial position by supplying the raw material between the two rolls 120. Information indicating the operating conditions of the briquetting machine 10 is hereinafter referred to as "operating conditions information". The control unit 110 gives briquette identification information to the operating conditions information for each lot, for example.

In addition, the briquette manufacturing conditions are obtained, for example, by further adding the type of the raw material, the state of the raw material, and the state of the environment where the briquetting machine 10 is placed to the operating conditions described above. Information regarding the briquette manufacturing conditions is hereinafter referred to as "manufacturing conditions information". The manufacturing conditions information may include only the operating conditions information without including information regarding the type of the raw material, the state of the raw material, and the state of the environment where the briquetting machine 10 is placed.

Next, the configuration of the evaluation device 20 will be described with reference to FIG. 2. The evaluation device 20 includes the evaluation information acquisition unit 220, the evaluation data generation unit 230, and a measurement unit 210. The measurement unit 210 may be provided outside the evaluation device 20. For example, the measurement unit 210 may be provided in the briquetting machine 10.

The measurement unit 210 measures the characteristics of the briquette manufactured by the briquetting machine 10. Measured items, that is, evaluation parameters can include one or more of the unit weight, compressive strength, tumbler strength, drop strength, apparent density, weight, size, and volume of the briquette, for example. The measurement unit 210 generates evaluation information indicating the evaluation results of a plurality of briquettes manufactured under the same manufacturing conditions by the briquetting machine 10. The evaluation information may be, for example, a table in which the value of each evaluation parameter is associated with each briquette in order to show results for a plurality of briquettes. For the evaluation information, briquette identification information, such as a lot number, is given for each lot, for example.

The evaluation information acquisition unit 220 acquires evaluation information from the measurement unit 210. The evaluation information acquisition unit 220 further acquires operating conditions information indicating the operating conditions of the briquetting machine 10, information regarding the raw material, and information regarding the environment, among the pieces of manufacturing conditions information, from the control unit 110. Among the pieces of manufacturing conditions information, information indicating the type of the raw material is acquired by the evaluation information acquisition unit 220 by further providing an input unit (not shown in the drawings) in the briquetting machine 10 or the evaluation device 20 so that the user inputs the information indicating the type of the raw material. The evaluation information acquisition unit 220 does not necessarily acquire the information regarding the raw material, the information regarding the environment, and the information indicating the type of the raw material, and may acquire only the operating conditions information as the manufacturing conditions information.

Here, for each of the evaluation information, the operation information, the information regarding the raw material, the information regarding the environment, and the information indicating the type of the raw material, briquette identification information is given for each lot, for example. Accordingly, the evaluation information acquisition unit 220 can associate the evaluation information, the operation information, the information regarding the raw material, the information regarding the environment, and the information indicating the type of the raw material with each other. A briquette is manufactured at least at a predetermined time interval or more for each piece of briquette identification information. Since the manufacturing conditions may differ for each piece of briquette identification information, the quality of the manufactured briquette may be different. There may be a case where the briquette identification information is different and the manufacturing conditions are the same. The briquette identification information can be further associated with the manufacturing time.

Similarly, the evaluation information acquisition unit 220 acquires a plurality of pieces of evaluation information and a plurality of pieces of manufacturing conditions information. In the present embodiment, briquettes for which a plurality of pieces of evaluation information are to be measured have different pieces of briquette identification information, and are manufactured under the different manufacturing conditions. For a plurality of pieces of manufacturing conditions, at least one of elements included in the manufacturing conditions can be made to be different. For example, for a plurality of manufacturing conditions, at least one of the rotation speed of the two rolls 120, pressure applied to the raw material located between the two rolls 120 through the two rolls 120, a raw material supply amount per unit time of the raw material supply unit 130, the type of the raw material, the temperature of the raw material, and the humidity can be made to be different.

The evaluation information acquisition unit 220 may acquire at least a set of evaluation information and manufacturing conditions information, among a plurality of pieces of evaluation information and a plurality of pieces of manufacturing conditions information to be acquired, by reading evaluation information and manufacturing conditions information generated in advance and stored externally.

The evaluation data generation unit 230 acquires a plurality of pieces of evaluation information from the evaluation information acquisition unit 220, and generates evaluation data that is data obtained by comparing a plurality of pieces of evaluation information with each other. The evaluation data may be, for example, a table in which a plurality of pieces of evaluation information are compared with each other or display data for displaying a plurality of pieces of evaluation information on the same graph in a state in which they can be distinguished from each other. By comparing a plurality of pieces of evaluation information with each other, it becomes easy to select the operating conditions to be adjusted or to determine the amount to be adjusted for the operating conditions.

The evaluation data generated by the evaluation data generation unit 230 can be displayed on a display unit 30 provided outside the evaluation device 20.

Figure 3:
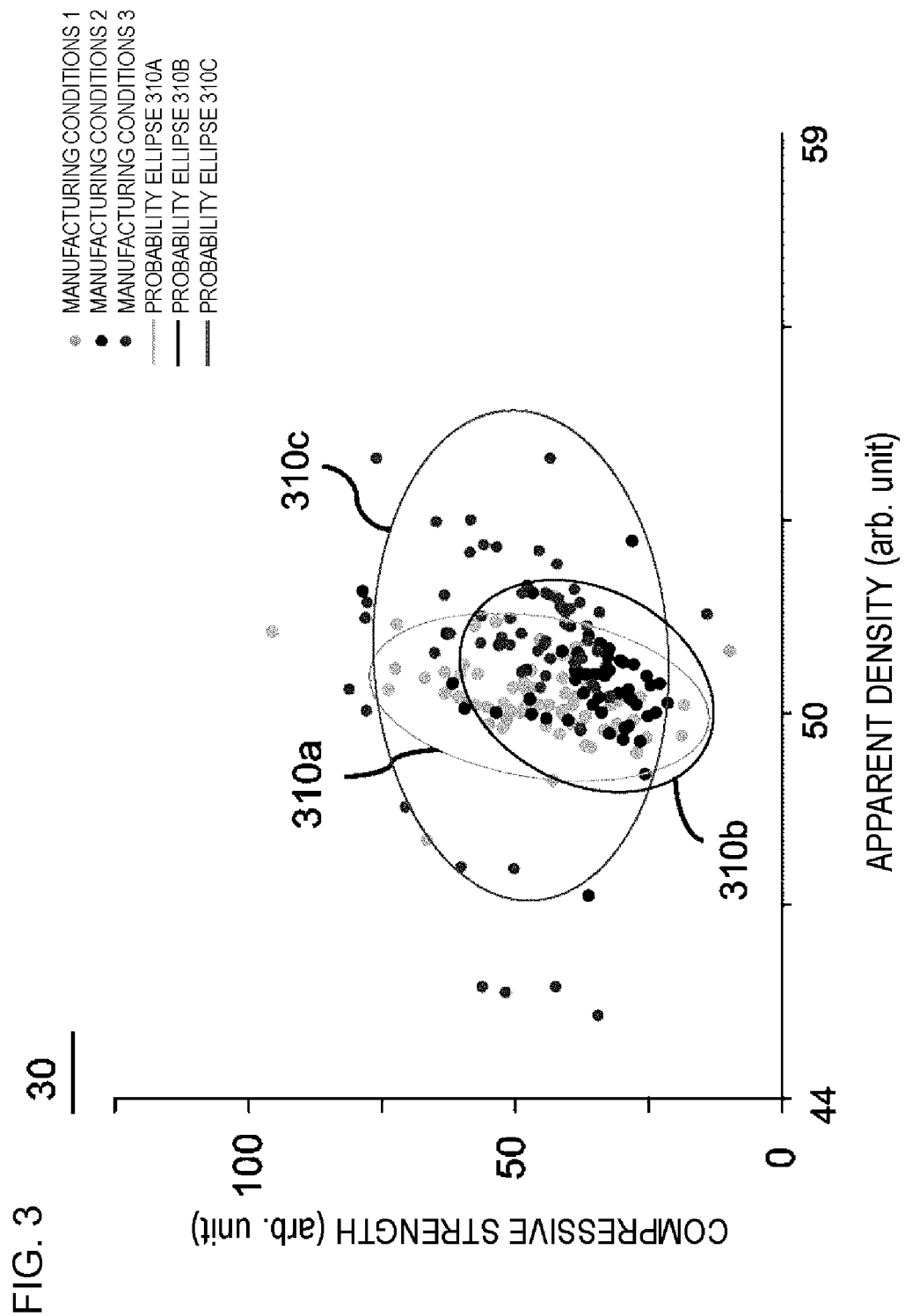
FIG. 3 is a diagram showing an example of an image displayed on a display unit.

FIG. 3 is a diagram showing an example of an image displayed on the display unit 30 in the present embodiment.

The graph to be display may be, for example, a multi-dimensional graph, such as a two-dimensional graph or a three-dimensional graph. An example of the two-dimensional graph will be described below.

Evaluation data includes the value of each of a plurality of evaluation parameters. The x axis of the graph is a first evaluation parameter, and the y axis of the graph is a second evaluation parameter. This diagram shows an example of a case where the first evaluation parameter is the apparent density and the second evaluation parameter is the compressive strength. In the graph, the evaluation result of each briquette is plotted. The plot can be identified for each piece of briquette identification information by changing the marker shape or color for each piece of briquette identification information. Thus, by generating a multi-dimensional graph in which the x axis is the first evaluation parameter and the y axis is the second evaluation parameter, it is possible to easily see the states of a plurality of evaluation parameters.

The scale of each axis can be the value of each evaluation parameter. In addition, as shown in this diagram, a target value as the quality of the briquette may be standardized and displayed as 50, or a deviation from the target value may be displayed as a positive or negative value. It is also possible to adopt a configuration in which these displayed ones can be switched.

By comparing a plurality of pieces of evaluation information on the graph, it is possible to visually recognize the relationship. Therefore, it becomes easier to select the operating conditions to be adjusted or to determine the amount to be adjusted for the operating conditions.

The evaluation data generation unit 230 generates a probability ellipse on a plane defined by the x and y axes for each of a plurality of pieces of evaluation information. The probability ellipse (probability oval) is an ellipse drawn so that a certain percentage of plots among all plots in the graph fall within the ellipse. For example, a probability ellipse can be defined to include 95% plots inside the graph.

FIG. 3 is an example showing evaluation results and probability ellipses of respective briquettes for briquettes manufactured under three different manufacturing conditions (manufacturing conditions 1, manufacturing conditions 2, and manufacturing conditions 3), which are different only in pressure applied to the raw material between the two rolls 120. A probability ellipse 310a is a probability ellipse generated based on the evaluation result of the manufacturing conditions 1. In the manufacturing conditions 2, the pressure is lower than that in the manufacturing conditions 1, and a probability ellipse 310b is a probability ellipse generated based on the evaluation result of the manufacturing conditions 2. In the manufacturing conditions 3, the pressure is higher than that in the manufacturing conditions 1, and a probability ellipse 310c is a probability ellipse generated based on the evaluation result of the manufacturing conditions 3.

From this diagram, the center coordinates of the probability ellipse 310a of the manufacturing conditions 1 are closest to a target value (50, 50). Among the states of the manufacturing conditions 1 to 3, as the pressure increases, the center of the ellipse moves in the y-axis direction. Accordingly, it can be seen that the number of briquettes with low compressive strength is reduced and the average value of compressive strength is high. In the manufacturing conditions 3 in which the pressure is high, the length in the x-axis direction is larger than that in the manufacturing conditions 1 and the manufacturing conditions 2. Accordingly, it can be seen that a variation in the apparent density is large. Therefore, it can be understood that a briquette, which is close to the target and has a small variation in quality, can be obtained according to the manufacturing conditions 1. In a case where it is necessary to further increase the compressive strength while avoiding an increase in the variation of the apparent density, it can be determined that operating conditions other than pressure should be adjusted.

In this manner, by generating the probability ellipse, it is possible to visually recognize a plurality of pieces of information, such as the average and the variation of evaluation data, through one diagram. Therefore, it becomes easier to select the operating conditions to be adjusted or to determine the amount to be adjusted for the operating conditions.

The proportion of plots to be included in the probability ellipse can be arbitrarily set. A configuration may be adopted in which the evaluation data generation unit 230 generates a plurality of probability ellipses having different proportions and those displayed on the display unit 30, among these, are switched.

In addition, a configuration may be adopted in which the evaluation data generation unit 230 generates a plurality of graphs that are different in at least one of the evaluation parameters of the x and y axes and those displayed on the display unit 30, among these, are switched.

In addition to the graph in which the x axis is the first evaluation parameter and the y axis is the second evaluation parameter, display data for displaying other auxiliary graphs may be further generated by the evaluation device 20. A configuration may be adopted in which those displayed on the display unit 30, among the plurality of graphs, are switched. As examples of an auxiliary graph, a graph in which the x axis is one of the operation parameters and the y axis is one of the ellipse parameters, a graph in which the x axis is a time at which a plurality of briquettes are manufactured and the y axis is an ellipse parameter of one of the evaluation parameters, and the like can be mentioned. The ellipse parameters refer to parameters that characterize a probability ellipse, and refer to the center coordinates, the length of the long axis, the length of the short axis, the inclination of the long axis, the area of the probability ellipse, and the like.

Although an example has been described in which the evaluation information acquisition unit 220 acquires evaluation information for each of a plurality of different manufacturing conditions, a plurality of pieces of evaluation information acquired by the evaluation information acquisition unit 220 may include evaluation information obtained under the same manufacturing conditions. The evaluation data generation unit 230 may generate evaluation data by comparing a plurality of pieces of evaluation information obtained under the same manufacturing conditions. For example, the evaluation data may be data obtained by comparing a plurality of pieces of evaluation information having different lot numbers. By comparing the pieces of evaluation information having the same manufacturing conditions and different pieces of briquette identification information (for example, different lots), it is possible to confirm the stability of the quality of the briquette. Specifically, by comparing the pieces of evaluation information having the same manufacturing conditions and different pieces of briquette identification information, it can be determined that granulation is normally performed stably if they are not significantly different from each other. In addition, it is possible to detect an unintended change in the manufacturing conditions. This helps to adjust the quality of the obtained briquette to be close to the target quality.

As described above, according to the evaluation device 20 of the present embodiment, it is possible to evaluate the operating conditions of the briquetting machine by comparing a plurality of pieces of evaluation information of the briquette. Therefore, it is possible to facilitate the adjustment of the operating conditions of the briquetting machine for bringing the quality of the obtained briquette close to the target quality.

Second Embodiment

Figure 4:
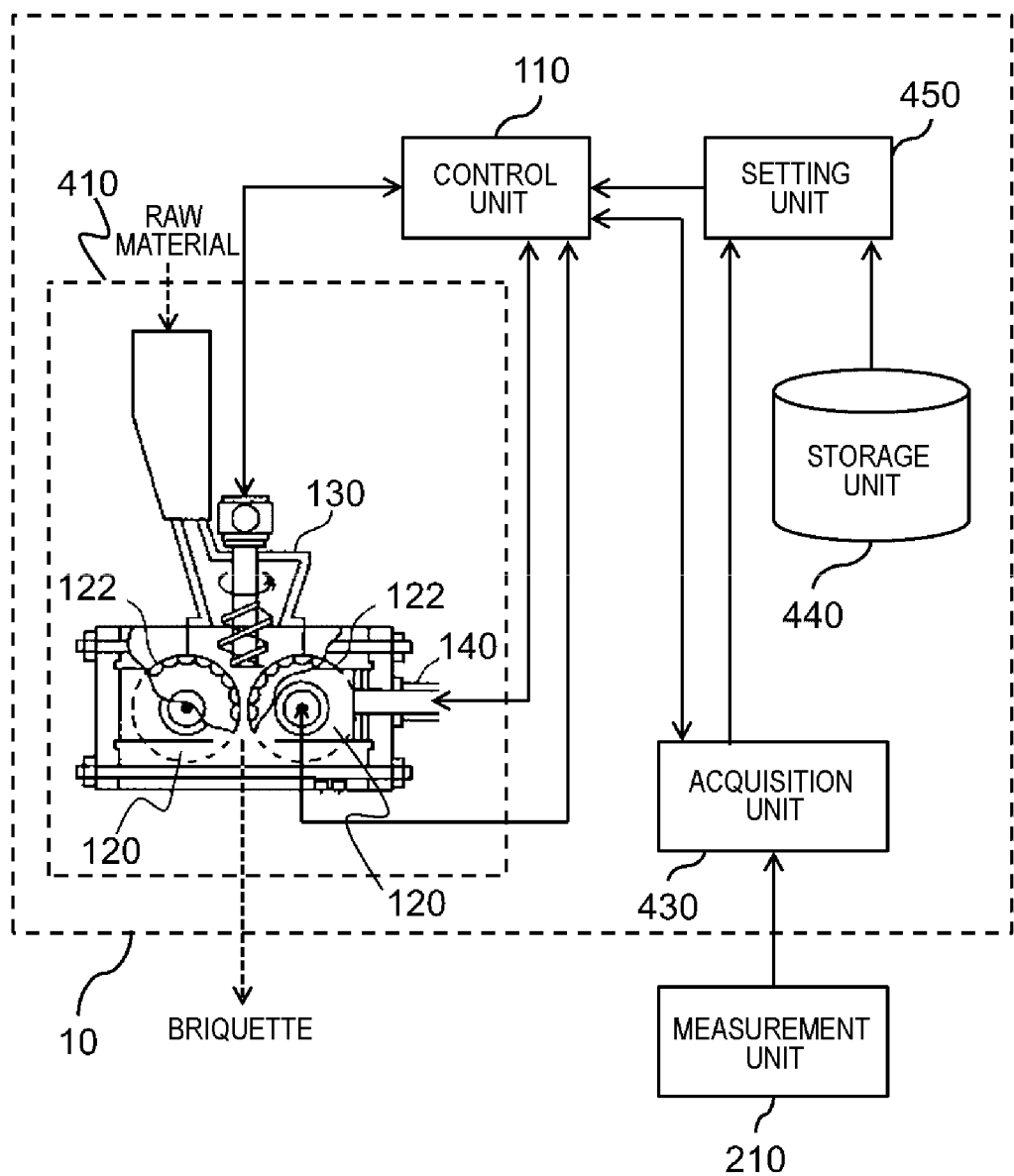
FIG. 4 is a block diagram showing the configuration of a briquetting machine according to a second embodiment.

FIG. 4 is a block diagram showing the configuration of a briquetting machine 10 according to a second embodiment.

The briquetting machine 10 according to the present embodiment includes a granulation unit 410, an acquisition unit 430, a setting unit 450, and a storage unit 440. The granulation unit 410 operates under the set operating conditions to manufacture briquettes. The acquisition unit 430 acquires evaluation information indicating the evaluation results of a plurality of briquettes manufactured under the same manufacturing conditions. The setting unit 450 sets the operating conditions based on the evaluation information. The storage unit 440 stores comparison data. The comparison data indicates the relationship between comparison evaluation information, which is evaluation information to be compared, and comparison operating conditions, which are operating conditions when the comparison evaluation information is obtained. The setting unit 450 adjusts the operating conditions based on the evaluation information acquired by the acquisition unit 430 and the comparison data. Detailed explanation thereof will be given below.

The comparison data is, for example, evaluation information and operating conditions acquired in the past. In the briquetting machine 10 according to the present embodiment, a briquette is manufactured by deriving how to adjust the operating conditions based on the relationship between the difference between the comparison evaluation information and the evaluation information and the difference between the comparison operating conditions and the operating conditions.

Similar to the briquetting machine 10 according to the first embodiment, the granulation unit 410 includes two rolls 120, a raw material supply unit 130, and a pressure adjustment unit 140. In addition, the briquetting machine 10 according to the present embodiment includes a control unit 110. The configuration of each of the two rolls 120, the raw material supply unit 130, the pressure adjustment unit 140, and the control unit 110 and their relationship and operation are the same as those in the first embodiment. The granulation unit 410 is controlled to operate under the set operating conditions by the control unit 110, thereby manufacturing a briquette.

In the present embodiment, the operating conditions can include two or more of the rotation speed of the two rolls 120, pressure applied to the raw material located between the two rolls 120 through the two rolls 120, and a raw material supply amount per unit time of the raw material supply unit.

The measurement unit 210 is provided outside the briquetting machine 10, and the measurement unit 210 generates evaluation information indicating the evaluation results of a plurality of briquettes, which are manufactured under the same manufacturing conditions, similar to the measurement unit 210 according to the first embodiment. The measurement unit 210 may be provided inside the briquetting machine 10. In the present embodiment, the measurement unit 210 further calculates ellipse parameters as a part of evaluation information based on the evaluation results. The evaluation information according to the present embodiment includes at least one of the calculated ellipse parameters. Detailed explanation thereof will be given later.

The acquisition unit 430 acquires the evaluation information from the measurement unit 210 similar to the evaluation information acquisition unit 220 according to the first embodiment. The acquisition unit 430 further acquires operating conditions information indicating the operating conditions of the briquetting machine 10, information regarding the raw material, and information regarding the environment, among the pieces of manufacturing conditions information, from the control unit 110. The information regarding the raw material and the information regarding the environment are acquired by the control unit 110 from respective sensors provided in the granulation unit 410 as in the first embodiment. Among the pieces of manufacturing conditions information, information indicating the type of the raw material is acquired by the acquisition unit 430 by making the information be input through a user input unit (not shown in the drawings) in the briquetting machine 10. Here, for each of the evaluation information, the operating conditions information, the information regarding the raw material, the information regarding the environment, and the information indicating the type of the raw material, briquette identification information, such as a lot number, is given for each lot, for example. Accordingly, the acquisition unit 430 can associate the evaluation information, the operating conditions information, the information regarding the raw material, the information regarding the environment, and the information indicating the type of the raw material with each other. The acquisition unit 430 may read and acquire evaluation information and manufacturing conditions information generated in advance and stored externally. The acquisition unit 430 does not necessarily acquire the information regarding the raw material, the information regarding the environment, and the information indicating the type of the raw material, and may acquire only the operating conditions information as the manufacturing conditions information.

The storage unit 440 stores comparison data. The comparison data is data indicating the relationship between comparison evaluation information, which is evaluation information to be compared, and comparison operating conditions, which are operating conditions when the comparison evaluation information is obtained. The comparison data is, for example, information for generating a table, an expression, or a graph.

The setting unit 450 acquires the evaluation information and the manufacturing information from the acquisition unit 430, and reads the comparison data from the storage unit 440. The operating conditions are adjusted based on the evaluation information and the comparison data. In a case where the operating conditions include a plurality of operation parameters, the setting unit 450 specifies an operation parameter to be adjusted and calculates the adjustment amount of the operation parameter based on the evaluation information and the comparison data. The operation of the setting unit 450 will be described in detail later.

The control unit 110 acquires information, which indicates the operation parameter to be adjusted and the adjustment amount, from the setting unit 450, and controls the granulation unit 410 to manufacture briquettes under the operating conditions based on the acquired information. The setting unit 450 specifies an operation parameter to be adjusted, among a plurality of operation parameters, so that it is avoidable to change operation parameters that do not need to be adjusted. Therefore, it is possible to minimize an operation of lowering the productivity, such as adjusting the operating conditions by stopping the operation of the briquetting machine 10. In addition, by reducing the time and effort of trial and error by the user, it is possible to obtain a briquette with desired quality in a short time or to stabilize the quality of the briquette.

Figure 5:
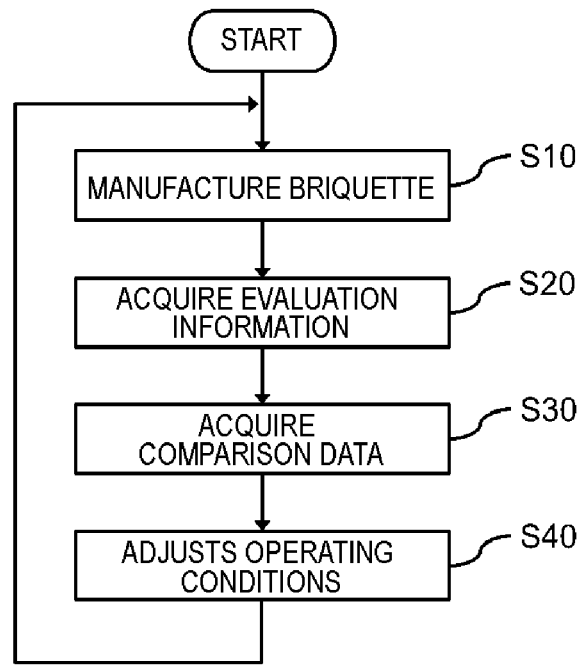
FIG. 5 is a diagram showing the flow of a method of manufacturing a briquette according to the second embodiment.

FIG. 5 is a diagram showing the flow of a method of manufacturing a briquette according to the present embodiment.

In this manufacturing method, a briquette is first manufactured by the granulation unit 410 (S10). The measurement unit 210 measures the manufactured briquette to generate evaluation information. Then, the acquisition unit 430 acquires the evaluation information from the measurement unit 210 (S20). Then, the setting unit 450 acquires the comparison data from the storage unit 440 (S30), and adjusts the operating conditions based on the evaluation information and the comparison data (S40). Detailed explanation thereof will be given below.

First, a briquette is manufactured by the granulation unit 410 of the briquetting machine 10 (S10). S10 is the same as the operation of manufacturing a briquette by the briquetting machine 10 in the first embodiment. The manufactured briquette is measured by the measurement unit 210, thereby generating evaluation information. The evaluation information according to the present embodiment is different from that according to the first embodiment in that ellipse parameters are included. Then, the acquisition unit 430 acquires the evaluation information from the measurement unit 210 (S20). S20 is the same as the operation in which the evaluation information acquisition unit 220 acquires the evaluation information from the measurement unit 210 in the first embodiment. The acquisition unit 430 acquires the manufacturing conditions information from the control unit 110 or the user input unit similar to the evaluation information acquisition unit 220 according to the first embodiment. Then, the setting unit 450 acquires the evaluation information and the manufacturing conditions information from the acquisition unit 430, and further acquires the comparison data from the storage unit 440 (S30). Then, the setting unit 450 adjusts the operating conditions based on the evaluation information and the comparison data (S40).

Figure 6:
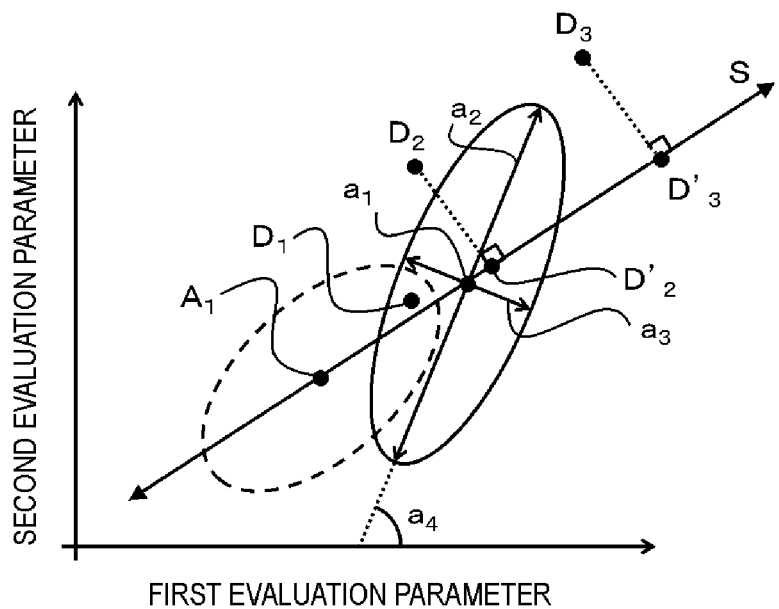
FIG. 6 is a diagram illustrating the details of step S40.

FIG. 6 is a diagram illustrating the details of step S40. An example of the operation of the setting unit 450 will be described in detail with reference to this diagram. In this diagram, a probability ellipse based on the evaluation result measured by the measurement unit 210 is shown by the solid line, and the center coordinates $a_1$ are shown. A probability ellipse in the comparison evaluation data is shown by the dotted line, and the center coordinates $A_1$ are shown. Examples $D_1$, $D_2$, and $D_3$ of the target center coordinates are shown.

The measurement unit 210 calculates a set of ellipse parameters as evaluation information regarding the manufacturing conditions based on the evaluation results of a plurality of briquettes manufactured under the same manufacturing conditions. Evaluation information a includes values $a_1$, $a_2$, $a_3$, and $a_4$ of a plurality of ellipse parameters. The ellipse parameters are the center coordinates, the length of the long axis, the length of the short axis, and the inclination of the long axis of the probability ellipse in the case of plotting the evaluation results of briquettes on a plane in which the first evaluation parameter of the briquette is defined as the x axis and the second evaluation parameter of the briquette is defined as the y axis. As shown in FIG. 6, it is assumed that the center coordinates of the probability ellipse based on the evaluation result is $a_1$, the length of the long axis is $a_2$, the length of the short axis is $a_3$, and the inclination of the long axis is $a_4$.

On the other hand, manufacturing conditions information b includes values $b_1$, $b_2$, and $b_3$ of a plurality of operation parameters when manufacturing briquettes. For example, $b_1$ is the rotation speed of the two rolls 120, $b_2$ is pressure applied to the raw material, and $b_3$ is a raw material supply amount per unit time.

The comparison data stored in the storage unit 440 includes comparison evaluation information A and comparison operating conditions B. The comparison evaluation information A includes values $A_1$, $A_2$, $A_3$, and $A_4$ of ellipse parameters. $A_1$ is the center coordinates, $A_2$ is the length of the long axis, $A_3$ is the length of the short axis, and $A_4$ is the inclination of the long axis. On the other hand, the comparison operating conditions B include values $B_1$, $B_2$, and $B_3$ of operation parameters when the comparison evaluation information A is obtained. For example, $B_1$ is the rotation speed of the two rolls 120, $B_2$ is pressure applied to the raw material, and $B_3$ is a raw material supply amount per unit time.

The priority of adjustment is defined for a plurality of operation parameters. The easier the adjustment, the higher the priority, or the easier the adjustment without lowering the productivity, the higher the priority. In the present embodiment, the priority is high in order of the raw material supply amount, the pressure, and the rotation speed. A case where $b_1=B_1$, $b_2=B_2$, and $b_3=B_3+\Delta b_3$ will be described. That is, this is a case where only the raw material supply amount, among the operation parameters, is different. Here, $\Delta b_3$ is a difference between $b_3$ and $B_3$. It is assumed that the manufacturing conditions other than the raw material supply amount, the pressure, and the rotation speed of the comparison data are the same as those when the evaluation information are obtained.

Figure 7:
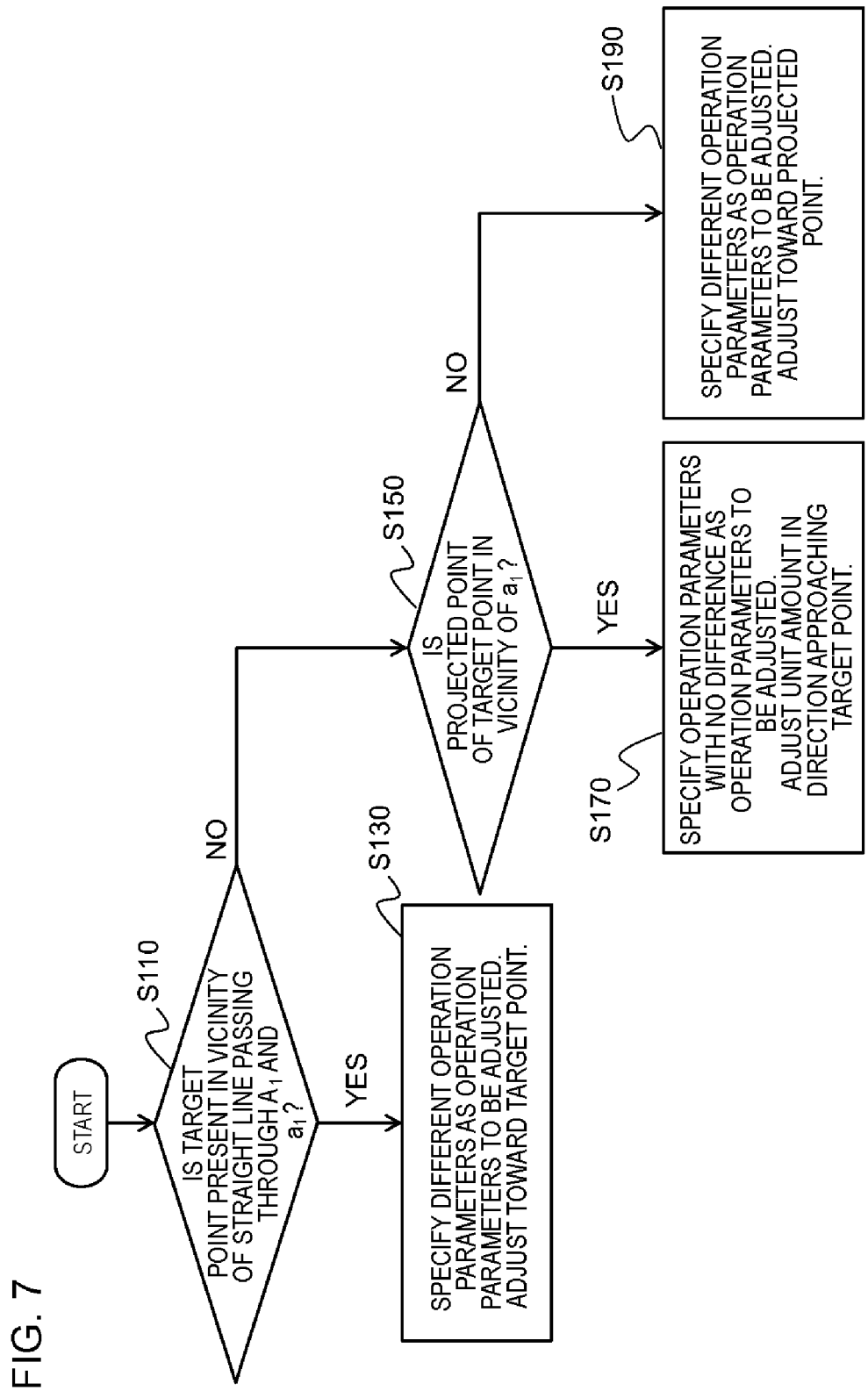
FIG. 7 is a diagram showing the operation flow of a setting unit.

FIG. 7 is a diagram showing the operation flow of the setting unit 450.

First, it is determined whether or not the target center coordinates are present in the vicinity of a straight line S passing through $A_1$ and $a_1$ (step S110). For example, in a case where the target center coordinates are present in the vicinity of the straight line S as in a case where $D_1$ shown in FIG. 6 is the target center coordinates (step S110: YES), it is determined that an operation parameter having different values in the operating conditions b and the comparison operating conditions B, that is, the raw material supply amount, needs to be continuously adjusted, and the operation parameter is specified as an operation parameter to be adjusted (step S130). In this diagram, the straight line S passing through $A_1$ and $a_1$ is shown by the arrow. The vicinity of the straight line indicates the inside of a region whose distance from the straight line is within a predetermined range. The adjustment amount $\Delta b$ of the operation parameter can be calculated from the relationship $\Delta b=(d \times \Delta b_3)/L$ in a case where the target center coordinates are present on the extended line of the line segment extending to $a_1$ from $A_1$, that is, on a side opposite to $A_1$ with respect to $a_1$. On the other hand, in other cases, the adjustment amount $\Delta b$ of the operation parameter can be calculated from the relationship $\Delta b=-(d \times \Delta b_3)/L$. L is a distance between $A_1$ and $a_1$, and d is a distance between the target center coordinates and $a_1$.

On the other hand, in a case where no target center coordinates are present in the vicinity of the straight line passing through $A_1$ and $a_1$ as in a case where $D_2$ or $D_3$ shown in FIG. 6 is the target center coordinates (step S110: No), it is then determined whether or not there is $a_1$ in the vicinity of a point obtained by projecting the target center coordinates onto the straight line S (step S150). The point obtained by projecting the target center coordinates onto the straight line S refers to an intersection between a perpendicular drawn from the center coordinates to the straight line S and the straight line S. The vicinity of the point indicates the inside of a region whose distance from the point is within a predetermined range.

In a case where there is $a_1$ in the vicinity of the point obtained by projecting the target center coordinates onto the straight line S, that is, in the vicinity of $D'_2$ in FIG. 6 as in a case where $D_2$ shown in FIG. 6 is the target center coordinates (step S150: YES), it is determined that an adjustment to the target is difficult with an operation parameter having different values in the operating conditions b and the comparison operating conditions B, that is, the raw material supply amount. Then, among the operation parameters other than the raw material supply amount, an operation parameter having the highest priority, that is, pressure, is specified as an operation parameter to be adjusted (step S170). At this time, the absolute value of the adjustment amount Δb is assumed to be a predetermined unit amount. In a case where the target center coordinates deviate upward from the straight line S, the direction of adjustment is determined to increase the second evaluation parameter. On the other hand, in a case where the target center coordinates deviate downward from the straight line S, the direction of adjustment is determined to decrease the second evaluation parameter. The correspondence between the direction in which each operation parameter is changed and the direction in which the second evaluation parameter is changed is known in advance and is stored.

In a case where there is no $a_1$ in the vicinity of the point obtained by projecting the target center coordinates onto the straight line S, that is, in the vicinity of $D'_3$ in FIG. 6 as in a case where $D_3$ shown in FIG. 6 is the target center coordinates (step S150: No), an operation parameter to be adjusted in order to bring the characteristics of the obtained briquette close to the projected point $D'_3$ is specified, and the adjustment amount Δb is calculated (step S190). Specifically, it is determined that an operation parameter having different values in the operating conditions b and the comparison operating conditions B, that is, the raw material supply amount, needs to be continuously adjusted. The adjustment amount Δb of the operation parameter can be calculated from the relationship $\Delta c=(d'\times\Delta b_3)/L$ in a case where there is $D'_3$ on the extended line of the line segment extending to $a_1$ from $A_1$, that is, on a side opposite to $A_1$ with respect to $a_1$. On the other hand, in other cases, the adjustment amount Δb of the operation parameter can be calculated from the relationship $\Delta b=-(d'\times\Delta b_3)/L$. L is a distance between $A_1$ and $a_1$, and d' is a distance between $D'_3$ and $a_1$.

As described above, the setting unit 450 adjusts the operating conditions based on the ellipse parameter, so that two evaluation parameters can be brought close to the target values while keeping a balance between the two evaluation parameters.

The operation of the setting unit 450 in step S40 is not limited to the example described above.

The storage unit 440 may store a plurality of pieces of comparison data having different manufacturing conditions, such as the type of the raw material or humidity. The setting unit 450 may select and read comparison data of which conditions other than the operating conditions are closest to that of the manufacturing conditions information when the evaluation information is obtained, from the plurality of pieces of comparison data based on the manufacturing conditions information when the evaluation information is obtained, so that the comparison data is used for adjustment of the operating conditions.

The evaluation information acquired by the measurement unit 210 may be stored in the storage unit 440 as one of the pieces of comparison data, so that the evaluation information can be used when manufacturing briquettes later. In this manner, basic data under many manufacturing conditions is accumulated. Therefore, it is possible to improve the accuracy of adjustment.

Parameters as target values are not limited to the center coordinates. For example, by setting a target value for the area of the ellipse instead of the center coordinates, it is possible to make a variation in the characteristics of the briquette fall within a desired range. Here, the area of the ellipse can be calculated from the length of the long axis of the ellipse and the length of the short axis of the ellipse. In another example, by setting a target value for the ratio of the length of the long axis to the length of the short axis instead of the center coordinates, it is possible to make the correlation of the characteristics of the briquette fall within a desired range.

Evaluation information does not necessarily include an ellipse parameter. The evaluation information may include, for example, other statistical values that are used to specify operation parameters to be adjusted or to calculate the adjustment amount.

The operating conditions may be adjusted as described in the present embodiment, and a graph and the like may be displayed on the display unit as described in the first embodiment. The setting unit 450 in the second embodiment may adjust the operating conditions based on the evaluation data generated by the evaluation data generation unit 230 in the first embodiment.

The briquetting machine 10 according to the present embodiment can also be said to be the following briquetting machine 10. The briquetting machine 10 includes the granulation unit 410, the acquisition unit 430, the setting unit 450, and the storage unit 440. The granulation unit 410 operates under the set operating conditions to manufacture briquettes. The acquisition unit 430 acquires evaluation information indicating the evaluation results of a plurality of briquettes manufactured under the same manufacturing conditions. The setting unit 450 sets the operating conditions based on the evaluation information. The storage unit 440 stores comparison data indicating the relationship between the comparison evaluation information, which is evaluation information to be compared, and the comparison operating conditions, which are operating conditions when the comparison evaluation information is obtained. The evaluation information includes a first evaluation parameter and a second evaluation parameter. The setting unit 450 determines whether or not to change predetermined operating conditions by comparing an evaluation value, which is based on the distribution of a plot in the case of plotting the evaluation results of a plurality of briquettes on a graph in which the first evaluation parameter is on the first axis and the second evaluation parameter is on the second axis, with a predetermined reference, and adjusts the operating conditions based on the comparison data.

The method of manufacturing a briquette according to the present embodiment can also be said to be the following method. The manufacturing method is a method of manufacturing a briquette using a briquetting machine, and includes an acquisition step and a setting step. In the acquisition step, evaluation information indicating the results of a plurality of briquettes manufactured under the same manufacturing conditions is acquired. In the setting step, the operating conditions are set based on the evaluation information. The evaluation information includes a first evaluation parameter and a second evaluation parameter. Then, in the setting step, it is determined whether or not to change predetermined operating conditions by comparing an evaluation value, which is based on the distribution of a plot in the case of plotting the evaluation results of a plurality of briquettes on a graph in which the first evaluation parameter is on the first axis and the second evaluation parameter is on the second axis, with a predetermined reference. Comparison data indicating the relationship between the comparison evaluation information, which is evaluation information to be compared, and the comparison operating conditions, which are operating conditions when the comparison evaluation information is obtained, is acquired, and the operating conditions are adjusted based on the evaluation information and the comparison data.

Next, the operation and effect of the present embodiment will be described.

According to the briquetting machine 10 and the method of manufacturing a briquette according to the present embodiment, the same operation and effect as in the first embodiment are obtained. In addition, since the adjustment of the operating conditions is automatically made, it is possible to efficiently manufacture a briquette having desired characteristics.

Third Embodiment

Figure 8:
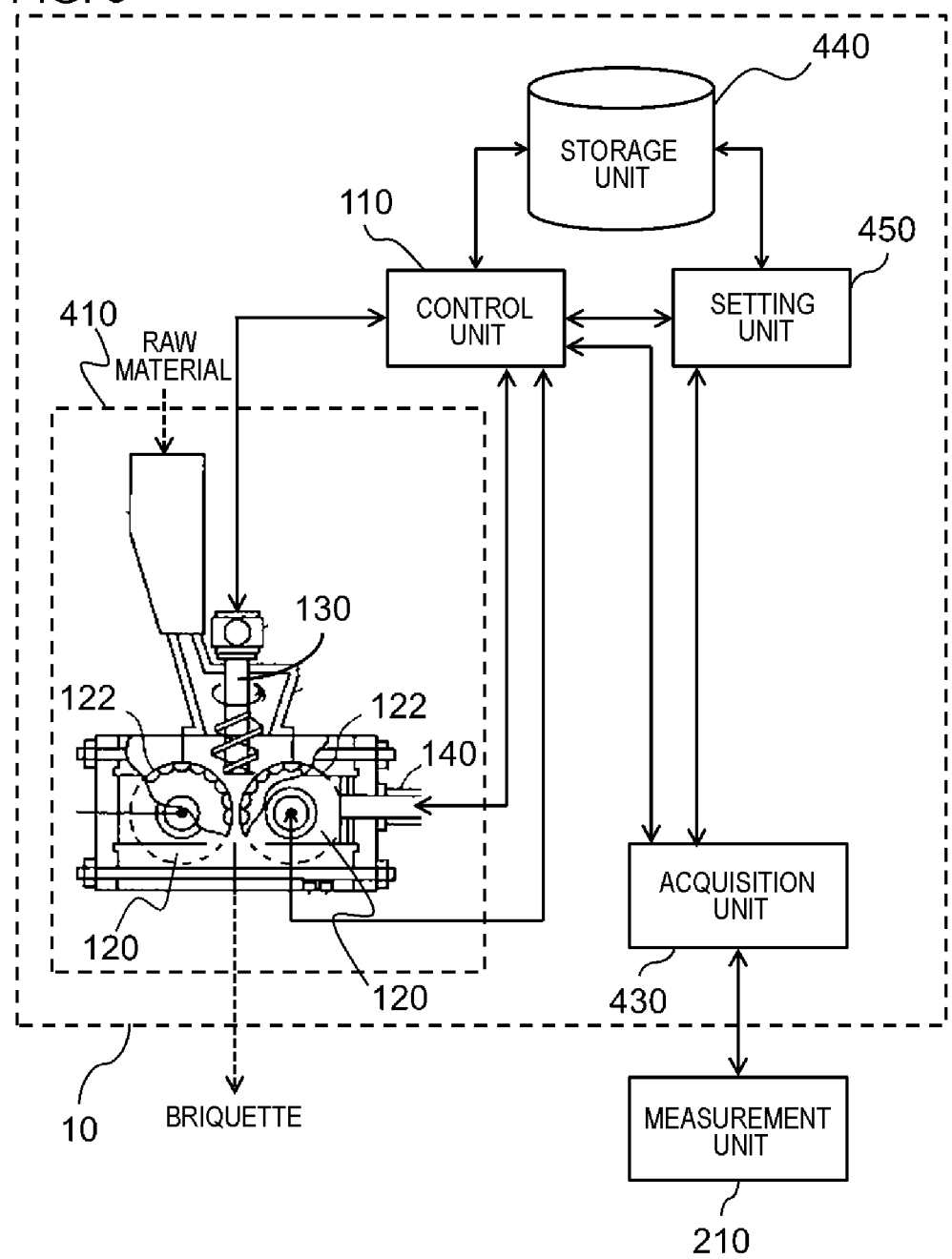
FIG. 8 is a block diagram showing an example of the configuration of a briquetting machine according to a third embodiment.

FIG. 8 is a block diagram showing an example of the configuration of a briquetting machine 10 according to the present embodiment. The briquetting machine 10 according to the present embodiment is the same as the briquetting machine 10 according to the second embodiment except for the points described below.

The briquetting machine 10 includes a granulation unit 410, an acquisition unit 430, and a setting unit 450. The granulation unit 410 operates under the set operating conditions to manufacture briquettes. The acquisition unit 430 acquires evaluation information indicating the evaluation results of a plurality of briquettes manufactured under the same manufacturing conditions. The setting unit 450 sets the operating conditions based on the evaluation information. In the present embodiment, the evaluation information includes a first evaluation parameter and a second evaluation parameter. In addition, the setting unit 450 determines whether or not to change predetermined operating conditions by comparing an evaluation value, which is based on the distribution of a plot in the case of plotting the evaluation results of a plurality of briquettes on a graph in which the first evaluation parameter is on the first axis and the second evaluation parameter is on the second axis, with a predetermined reference. Detailed explanation thereof will be given below.

In the present embodiment, as described above, the granulation unit 410 includes the two rolls 120 facing each other and the raw material supply unit 130 for supplying the raw material between the two rolls 120, and a recessed portion for manufacturing the briquette is formed on at least one of the surfaces of the two rolls 120. The raw material is, for example, a powder raw material.

In the present embodiment, the operating conditions include a plurality of operation parameters, and the setting unit 450 selects an operation parameter, which is to be determined as to whether or not to be changed, based on the type of the evaluation value. For the type of the evaluation value, for example, the user selects the type of the evaluation value when evaluating the briquette, and an evaluation value of the selected type is generated. The evaluation value of the selected type can be acquired by the acquisition unit 430. Alternatively, the acquisition unit 430 may acquire an evaluation value of the type set in advance by the user or the like among a plurality of types of evaluation values.

The quality of the briquette manufactured by the granulation unit 410 is determined in a complex manner by a plurality of operation parameters, and also changes depending on the state (amount of moisture or the like) of the raw material, granulation environment (temperature or humidity), or the like. Therefore, in order to obtain a briquette with desired quality, it is necessary to appropriately adjust a plurality of operation parameters.

The operating conditions of the briquetting machine 10 include as operation parameters, for example, the rotation speed of the two rolls 120, pressure applied to the raw material located between the two rolls 120 through the two rolls 120, and a raw material supply amount per unit time of the raw material supply unit 130. The operating conditions may include not only operation parameters that are directly controlled to become set values, that is, the rotation speed of the rolls 120 (hereinafter, referred to as "roll rotation speed"), a raw material supply amount determined by the rotation speed of a screw feeder or the like of the raw material supply unit 130 (hereinafter, referred to as "feeder rotation speed"), and pressure applied to the raw material determined by the pressure of the pressure adjustment unit 140 (hereinafter, referred to as "roll pressure") but also conditions that are indirectly controlled to become specific set values by adjusting these. That is, the operating conditions may include operation parameters, such as consumption current, power consumption, the amount of movement of the roll 120, and a value of distortion occurring in the support portion of the roll 120, and a roll load. The operating conditions do not need to include all of these as operation parameters, and may include any of them.

Here, the consumption current is consumption current required for the rotation of the roll. The power consumption is power consumption required for the rotation of the roll. The consumption current and the power consumption can be acquired from the external output signal of an inverter for a roll. As described above, the roll movement amount is a magnitude by which each roll 120 moves from the initial position by supplying the raw material between the two rolls 120, and is measured by a distance sensor provided in the roll 120. The distortion value is a value indicating the amount of distortion occurring in the support portion of the roll 120 due to the stress at the time of driving. Here, the roll load is the magnitude of the stress applied to the roll 120, and is measured by a load cell provided in one of the rolls 120. The value of each operation parameter under driving of the granulation unit 410 is acquired from each sensor or the like by the control unit 110.

In the present embodiment, evaluation values include at least one of the center coordinates, the length of the long axis, the length of the short axis, the inclination of the long axis, and the area of the probability ellipse in the case of plotting the evaluation results of a plurality of briquettes on a graph in which the first evaluation parameter is on the first axis and the second evaluation parameter is on the second axis. Evaluation values generated by the measurement unit 210 may be acquired by the acquisition unit 430, and these may be acquired by the setting unit 450. Alternatively, a generation unit (not shown in the drawings) provided in the briquetting machine 10 may generate evaluation values based on the evaluation information acquired by the acquisition unit 430, and the acquisition unit 430 may acquire these.

By using the evaluation values obtained from the probability ellipse, adjustment of the operating conditions based on two evaluation parameters relevant to quality can be done at once.

Figure 9:
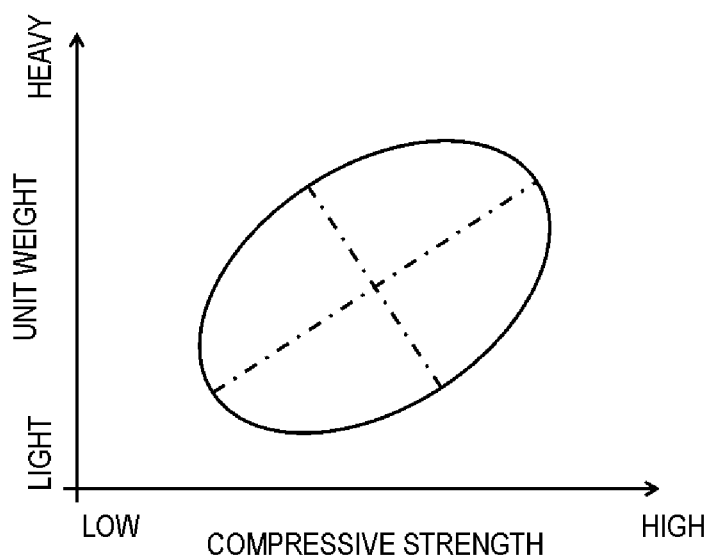
FIG. 9 is a diagram showing an example of the probability ellipse according to the third embodiment.

FIG. 9 is a diagram showing an example of the probability ellipse according to the present embodiment. In the present embodiment, an example of a case where the first evaluation parameter is the compressive strength and the second evaluation parameter is the unit weight of the briquette will be specifically described hereinafter. However, the present invention is not limited thereto. In this diagram, an example is shown in which the first axis is the x axis (horizontal axis)

and the second axis is the y axis (vertical axis). However, the present invention is not limited thereto. The first axis may be the y axis, and the second axis may be the x axis. In this case, it is preferable to appropriately change the following determination relationship between the inclination and the reference and the like.

In the briquetting machine 10 according to the present embodiment, by feedback (FB) control based on proportional-integral-derivative controller (PID) control, power consumption is controlled to become a specific set value. Specifically, the power consumption is monitored by the output signal of the inverter for a roll, and the feeder rotation speed under granulation is adjusted so that the power consumption becomes the set value.

The power consumption can be used as an indicator for performing a good granulation operation at a specific roll rotation speed. By performing control so that the power consumption is kept constant, the pressure applied to the raw material can be kept constant. Accordingly, the quality of the briquette can be stabilized.

Usually, the user knows in advance the standard of the roll rotation speed, the roll pressure, and the power consumption to obtain briquettes of the target manufacturing amount or the target quality, and performs initial setting of the operating conditions based on the standard to start an operation. The user adjusts the operating conditions so as to obtain the quality matching the product item of the day. When the operation is started, the feeder rotation speed is FB controlled so that the power consumption become a set value. However, in a case where the characteristics of the raw material change unexpectedly, it is not possible to perceive that the relationship between the power consumption and the quality of the briquette has changed. Accordingly, there is a problem that it is not possible to notice that the quality has changed.

Since the briquetting machine 10 according to the present embodiment determines whether or not to change the operating conditions using the evaluation value obtained from the evaluation result of actual briquette, it is possible to avoid such a problem.

Figure 10:
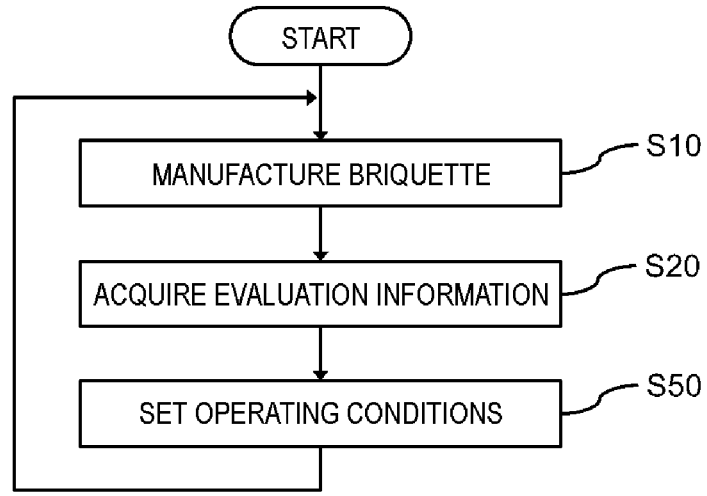
FIG. 10 is a flowchart showing a method of manufacturing a briquette according to the third embodiment.

FIG. 10 is a flowchart showing a method of manufacturing a briquette according to the present embodiment. The method of manufacturing a briquette according to the present embodiment is realized by the briquetting machine 10 according to the present embodiment. The manufacturing method includes an acquisition step (step S20) and a setting step (step S50). After a plurality of briquettes manufactured under the same manufacturing conditions in the granulation step (step S10) are evaluated by, for example, the evaluation device described in the first embodiment, evaluation information indicating he evaluation result is acquired in the acquisition step. In the setting step, the operating conditions are set based on the evaluation information. The evaluation information includes a first evaluation parameter and a second evaluation parameter. Then, in the setting step, it is determined whether or not to change predetermined operating conditions by comparing an evaluation value, which is based on the distribution of a plot in the case of plotting the evaluation results of a plurality of briquettes on a graph in which the first evaluation parameter is on the first axis and the second evaluation parameter is on the second axis, with a predetermined reference.

Figure 11:
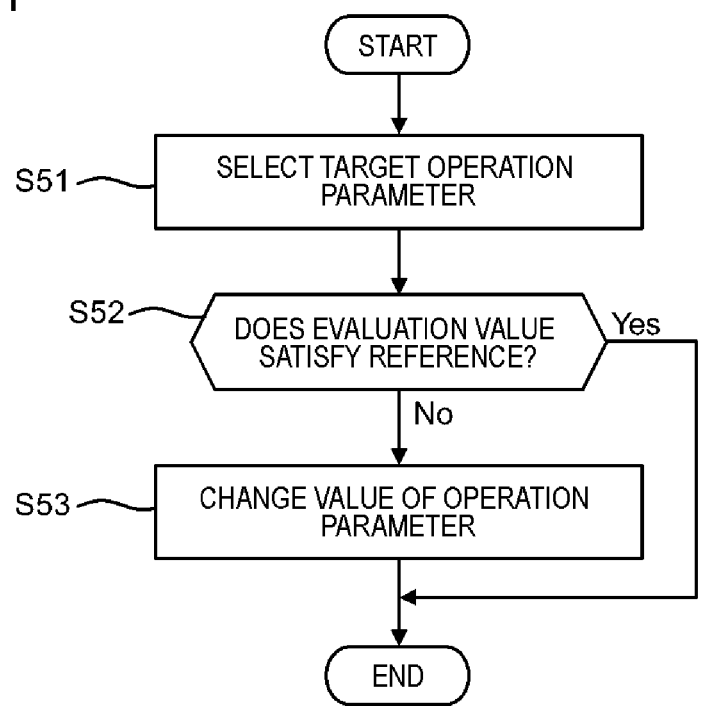
FIG. 11 is a flowchart showing the content of a setting step of the method of manufacturing a briquette according to the third embodiment.

FIG. 11 is a flowchart showing the content of the setting step (step 50) of the method of manufacturing a briquette according to the present embodiment. The setting unit 450 acquires an evaluation value from the acquisition unit 430, and selects an operation parameter to be determined among the operating conditions based on the acquired evaluation value, for example (step S51). Then, the setting unit 450 determines whether or not the acquired evaluation value satisfies a predetermined reference (step S52). In a case where the evaluation value satisfies the reference (Yes in step S52), the setting unit 450 does not change the selected operation parameter. In a case where the evaluation value does not satisfy the reference (No in step S52), the setting unit 450 outputs a signal for changing the selected operation parameter to the control unit 110. The setting unit 450 can repeat the determination regarding whether or not to change the operating conditions, for example, at predetermined time intervals. Alternatively, the acquisition unit 430 may acquire evaluation information according to a predetermined operation (operation as a trigger for acquiring information) that the user performs on the briquetting machine 10 or the like, and the setting unit 450 may determine whether or not to change the operating conditions.

Figure 12:
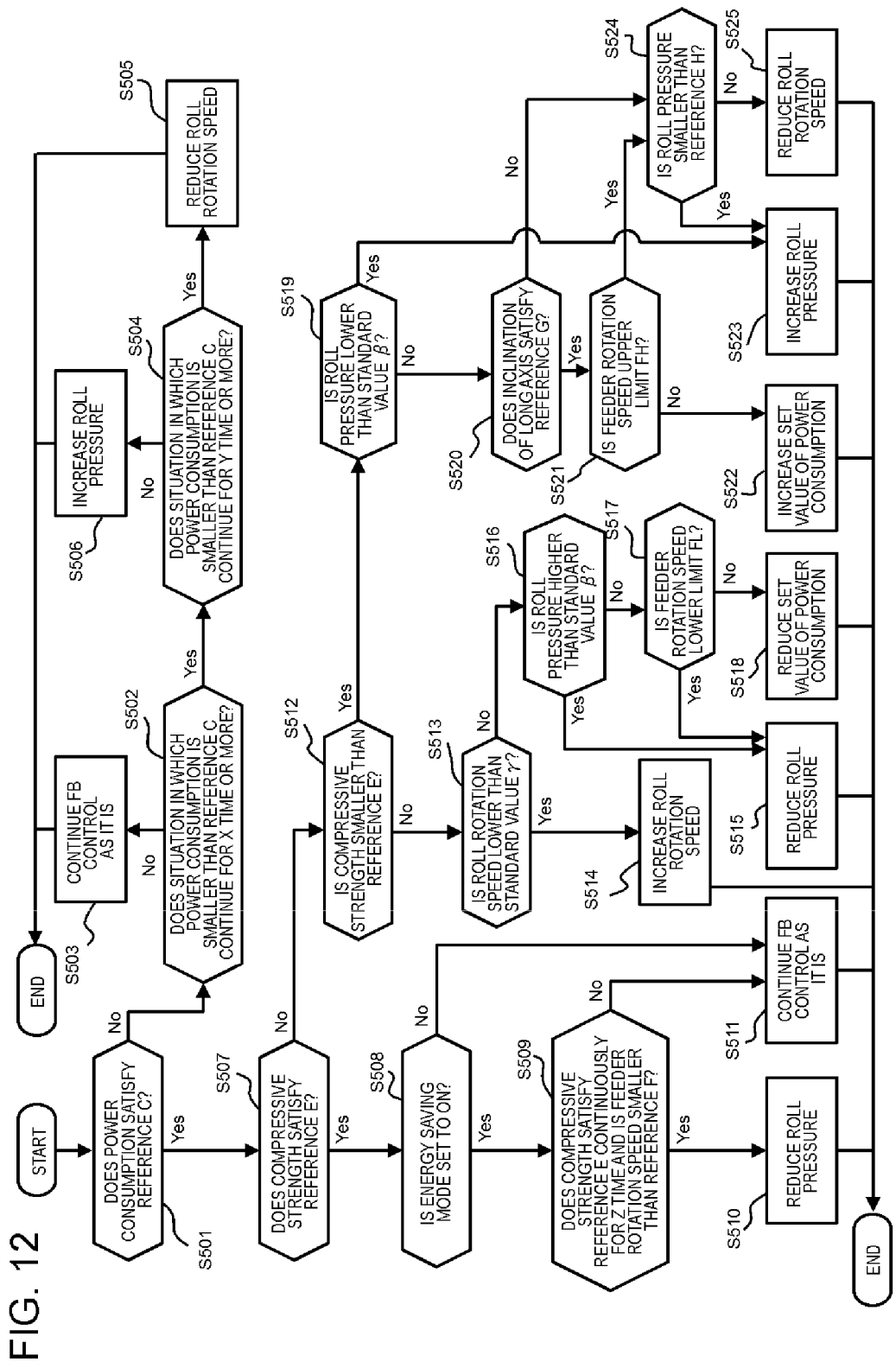
FIG. 12 is a flowchart showing an example of the setting step of the method of manufacturing a briquette according to the third embodiment in detail.

FIG. 12 is a flowchart showing an example of the setting step (step S50) of the method of manufacturing a briquette according to the present embodiment in detail.

In the manufacturing method described with reference to FIG. 12, the first evaluation parameter is any of the compressive strength, tumbler strength, and drop strength of the briquette, and the second evaluation parameter is the unit weight of the briquette. Hereinafter, an example will be described in which the setting unit 450 determines whether or not to change at least one of the rotation speed of two rolls and the pressure, which is applied to the raw material located between two rolls through the two rolls, as operation parameters, in a case where the evaluation value is the inclination of the long axis.

First, the setting unit 450 acquires information indicating the current power consumption from the control unit 110, and acquires information indicating a reference C relevant to power consumption from the storage unit 440. Then, the setting unit 450 determines whether or not the power consumption satisfies the reference C (step S501). The reference C is, for example, whether or not the power consumption is within a range of ±5% of the set value in the FB control of power consumption.

In a case where the power consumption is not within the range, that is, in a case where the reference C is not satisfied (No in step S501), the setting unit 450 further determines whether or not a situation in which the power consumption is smaller than the range of the reference C continues for a specific time (hereinafter, referred to as "X time") or more (step S502). Information indicating the time is held in the storage unit 440 in advance, and can be read and acquired by the setting unit 450. The X time is 10 minutes, for example.

In a case where the situation in which the power consumption is smaller than the range of the reference C does not continue for the X time or more (No in step S502), the setting unit 450 continues the FB control without changing the operating conditions (step S503). This is because control is performed so that the power consumption become the set value and accordingly, it can be expected that the power consumption satisfies the reference C by continuously performing the FB control as it is.

In a case where the situation in which the power consumption is smaller than the range of the reference C continues for the X time or more (Yes in step S502), the setting unit 450 further determines whether or not the situation in which the power consumption is smaller than the range of the reference C continues for a specific time (hereinafter, referred to as "Y time") or more (step S504).

The information indicating the time is held in the storage unit 440 in advance, and can be read and acquired by the setting unit 450.

In a case where the situation in which the power consumption is smaller than the range of the reference C does not continue for the Y time or more (No in step S504), the setting unit 450 changes the operating conditions so as to increase the roll pressure (step S506). Then, the FB control is continued.

In a case where the situation in which the power consumption is smaller than the range of the reference C continues for the Y time or more (Yes in step S504), the setting unit 450 changes the operating conditions so as to reduce the roll rotation speed (step S505). Then, the FB control is continued.

On the other hand, a case where the power consumption satisfies the reference C (Yes in step S501) will be described below. Even if the power consumption satisfies the reference C, in a case where the characteristics of the raw material change unexpectedly, there is a problem that the relationship between the power consumption and the quality of the briquette changes and accordingly the quality changes. Therefore, the setting unit 450 further performs determination or the like as follows. First, the setting unit 450 acquires the average value (in this diagram, simply referred to as "compressive strength") of the compressive strength, and acquires information indicating a reference E for the compressive strength from the storage unit 440. The measurement unit 210 may generate the average value of the compressive strength based on the evaluation results of a plurality of briquettes manufactured under the same manufacturing conditions and the acquisition unit 430 may acquire the average value of the compressive strength, or the setting unit 450 may acquire the average value generated from the evaluation information acquired by the acquisition unit 430. Then, the setting unit 450 determines whether or not the average value of the compressive strength satisfies the reference E (step S507). The reference E is, for example, whether or not the average value of the compressive strength is within a range of ±10% of the target value of the compressive strength of a briquette to be manufactured.

In a case where the average value of the compressive strength satisfies the reference E (Yes in step S507), a briquette having a desired compressive strength is obtained. Then, the setting unit 450 determines whether or not the energy saving mode is set to ON (step S508). The energy saving mode can be set to ON by the user in a case where it is necessary to manufacture a desired briquette with low power consumption. Information indicating ON/OFF of the energy saving mode is input to an input unit (not shown) by the user, and the setting unit 450 can read and acquire the information held in the storage unit 440.

In a case where the energy saving mode is OFF (No in step S508), the setting unit 450 continues the FB control without changing the operating conditions.

On the other hand, in a case where the energy saving mode is ON (Yes in step S508), the setting unit 450 determines whether or not the compressive strength satisfies the reference E continuously for a specific time (hereinafter, referred to as "Z time") and whether or not the feeder rotation speed is smaller than a reference F (step S509). Information indicating the time and information indicating the reference F relevant to the feeder rotation speed are held in the storage unit 440 in advance, and can be read and acquired by the setting unit 450. The reference F can be appropriately set according to the target distribution of the unit weight or the compressive strength of the briquette. The details thereof will be described later.

In a case where the state, in which the compressive strength satisfies the reference E, does not continue for the Z time or in a case where the feeder rotation speed is not smaller the reference F (No in step S509), the setting unit 450 continues the FB control without changing the operating conditions.

In a case where the compressive strength satisfies the reference E continuously for the Z time and the feeder rotation speed is smaller than the reference F (Yes in step S509), the setting unit 450 changes the operating conditions so as to reduce the roll pressure (step S510). Then, the FB control is continued. This is because the power consumption of the entire device can be reduced by lowering the roll pressure.

On the other hand, in a case where the average value of the compressive strength does not satisfy the reference E (No in step S507), a briquette having a desired compressive strength is not obtained. In this case, it is necessary to change some operating conditions. Then, the setting unit 450 determines whether or not the average value of the compressive strength is lower than the range of the reference E (step S512).

In a case where the average value of the compressive strength is larger than the range of the reference E (No in step S512), it is necessary to reduce the compressive strength. Here, the setting unit 450 determines whether or not the roll rotation speed is lower than a standard value $\gamma$ (step S513). The standard value $\gamma$ is a standard set value of roll rotation speed, for example, an initial set value of the roll rotation speed at the start of operation. Information indicating the standard value $\gamma$ is held in the storage unit 440 in advance, and can be read and acquired by the setting unit 450.

In a case where the roll rotation speed is lower than the standard value $\gamma$ (Yes in step S513), the roll rotation speed is lower than the standard due to adjustment and change of the operating conditions up to then. Therefore, in order to bring the roll rotation speed close to the standard value $\gamma$, the setting unit 450 changes the operating conditions so as to increase the roll rotation speed (step S514). Then, the FB control is continued. In this manner, it is possible to adjust the operating conditions so as to obtain a desired briquette by lowering the compressive strength while maintaining the roll rotation speed within a standard range.

In a case where the roll rotation speed is equal to or higher than the standard value $\gamma$ (No in step S513), the setting unit 450 further determines whether or not the roll pressure is higher than a standard value $\beta$ (step S516). The standard value $\beta$ is a standard set value of roll pressure, for example, an initial set value of the roll rotation speed at the start of operation. Information indicating the standard value $\beta$ is held in the storage unit 440 in advance, and can be read and acquired by the setting unit 450.

In a case where the roll pressure is higher than the standard value $\beta$ (Yes in step S516), the roll pressure is higher than the standard due to adjustment and change of the operating conditions up to then. Therefore, in order to bring the roll pressure close to the standard value $\beta$, the setting unit 450 changes the operating conditions so as to reduce the roll pressure (step S515). Then, the FB control is continued. In this manner, it is possible to adjust the operating conditions so as to obtain a desired briquette by lowering the compressive strength while maintaining the roll pressure within a standard range.

In a case where the roll pressure is equal to or lower than the standard value β (No in step S516), the setting unit 450 determines whether or not the feeder rotation speed is a lower limit FL (step S517). Information indicating the lower limit FL is held in the storage unit 440 in advance, and can be read and acquired by the setting unit 450. FB control is performed in the range of the feeder rotation speed equal to or greater than the lower limit FL. The lower limit FL can be appropriately set according to the target distribution of the unit weight or the compressive strength of the briquette. The details thereof will be described later.

In step S513, a standard range γ having a specific width may be used instead of the standard value γ. In this case, step S514 may be performed in a case where the roll rotation speed is smaller than the lower limit of the standard range γ, and step S516 may be performed in a case where the roll rotation speed is within the range or exceeds the range. This is the same for the standard value β in step S516.

In a case where the feeder rotation speed is the lower limit FL (Yes in step S517), it is not possible to lower the feeder rotation speed any more. Therefore, the setting unit 450 changes the operating conditions so as to reduce the roll pressure (step S515). Then, the FB control is continued. In this manner, it is possible to lower the compressive strength of the obtained briquette.

In a case where the feeder rotation speed is not the lower limit FL (No in step S517), the setting unit 450 changes the operating conditions so as to reduce the set value of BF control of power consumption (step S518). Then, the FB control is continued. Since the feeder rotation speed decreases in this manner, the amount of raw material supplied between the rolls 120 is reduced. Therefore, it is possible to reduce the compressive strength of the obtained briquette.

On the other hand, in a case where the average value of the compressive strength is lower than the range of the reference E (Yes in step S512), it is necessary to increase the compressive strength. Here, the setting unit 450 determines whether or not the roll pressure is lower than the standard value β (step S519).

In a case where the roll pressure is lower than the standard value β (Yes in step S519), the roll pressure is lower than the standard due to adjustment and change of the operating conditions up to then. Therefore, in order to bring the roll pressure close to the standard value β, the setting unit 450 changes the operating conditions so as to increase the roll pressure (step S523). Then, the FB control is continued. In this manner, it is possible to adjust the operating conditions so as to obtain a desired briquette by increasing the compressive strength while maintaining the roll pressure within a standard range.

In a case where the roll pressure is equal to or higher than the standard value β (No in step S519), the setting unit 450 acquires information indicating the inclination of the long axis of the probability ellipse and information indicating a reference G, and determines whether or not the inclination of the long axis of the probability ellipse satisfies the reference G (step S520). The inclination of the long axis is an angle between the x axis and the long axis of the probability ellipse in the case of plotting the evaluation results of briquettes on a graph in which the compressive strength is on the x axis and the unit weight is on the y axis. The setting unit 450 can acquire the inclination of the long axis as an evaluation value, for example, from the acquisition unit 430 as described above. Information indicating the reference G is held in the storage unit 440 in advance, and can be read and acquired by the setting unit 450. For example, it is assumed that the reference G is satisfied in a case where the inclination of the long axis is equal to or smaller than a specific magnitude. The reference G can be appropriately set according to the target distribution of the unit weight or the compressive strength of the briquette. The details thereof will be described later.

In a case where the inclination of the long axis of the probability ellipse does not satisfy the reference G (No in step S520), it can be seen that it is necessary to change at least one of the roll pressure and the roll rotation speed. This is because the inclination is large and accordingly it is not possible to effectively increase the compressive strength even if the feeder rotation speed is increased. The details thereof will be described later. Here, the setting unit 450 further determines whether or not the roll pressure is lower than a reference H (step S524). The reference H is, for example, a specific value for roll pressure. For example, the reference H is an allowable upper limit that does not put too much burden on the briquetting machine. Information indicating the reference H is held in the storage unit 440 in advance, and can be read and acquired by the setting unit 450.

In a case where the roll pressure is lower than the reference H (Yes in step S524), the setting unit 450 changes the operating conditions so as to increase the roll pressure (step S523). Then, the FB control is continued. In this manner, it is possible to effectively increase the compressive strength of the briquette.

In a case where the roll pressure is equal to or higher than the reference H (No in step S524), the setting unit 450 changes the operating conditions so as to reduce the roll rotation speed, because it is not possible to further increase the roll pressure (step S525). Then, the FB control is continued. In this manner, it is possible to increase the compressive strength of the briquette.

In a case where the inclination of the long axis of the probability ellipse satisfies the reference G (Yes in step S520), it is possible to further improve the compressive strength by the feeder rotation speed. Here, the setting unit 450 determines whether or not the feeder rotation speed is an upper limit FH (step S521). Information indicating the upper limit FH is held in the storage unit 440 in advance, and can be read and acquired by the setting unit 450. FB control is performed in the range of the feeder rotation speed equal to or smaller than the upper limit FH. The upper limit FH can be appropriately set according to the target distribution of the unit weight or the compressive strength of the briquette. The details thereof will be described later.

In a case where the feeder rotation speed is the upper limit FH (Yes in step S521), it is not possible to increase the feeder rotation speed any more. Therefore, the process proceeds to step S524 in which the setting unit 450 determines whether or not the roll pressure is lower than the reference H. Then, as described above, the roll pressure is increased in a case where the roll pressure is lower than the reference H (step S523), and the roll rotation speed is reduced otherwise (step S525). Then, FB control is continued. In this manner, it is possible to increase the compressive strength of the obtained briquette.

In a case where the feeder rotation speed is not the upper limit FH (No in step S521), the setting unit 450 changes the operating conditions so as to increase the set value of BF control of power consumption (step S522). Then, the FB control is continued. Since the feeder rotation speed increases in this manner, the amount of raw material supplied between the rolls 120 is increased. Therefore, it is possible to increase the compressive strength of the obtained briquette.

As described above, the setting unit 450 according to the present embodiment acquires the inclination of the long axis as an evaluation value, and determines whether or not to change at least one of the rotation speed of two rolls and the pressure, which is applied to the raw material located between two rolls through the two rolls, as operation parameters (step S520). In this manner, it is possible to effectively change operation parameters with which the characteristics of the briquette can be adjusted.

According to the briquetting machine 10 of the present embodiment, it is possible to stably manufacture a briquette with desired quality without depending on the skill of the user.

In the above, in a case where the setting unit 450 increases and decreases the set value of power consumption, the roll pressure, and the roll rotation speed, it is preferable to increase and decrease the set value of power consumption, the roll pressure, and the roll rotation speed by a predetermined unit amount. Each unit amount is held in the storage unit 440 in advance, and the setting unit 450 can read and acquire the unit amount.

An adjustable range may be set for each of the roll rotation speed, the roll pressure, and the feeder rotation speed, and adjustment may be performed only within the range. In this manner, a desired briquette can be obtained while ensuring stability of the briquetting machine 10 and its operation. In that case, for example, for each of a case where the roll rotation speed, the roll pressure, or the feeder rotation speed deviates from the upper limit of the range and a case where the roll rotation speed, the roll pressure, or the feeder rotation speed deviates from the lower limit of the range, operation parameters to be adjusted instead are set in advance, and the information is stored in the storage unit. In a case where the roll rotation speed, the roll pressure, or the feeder rotation speed deviates from the adjustable range, operation parameters to be adjusted instead may be adjusted.

Figure 13A:
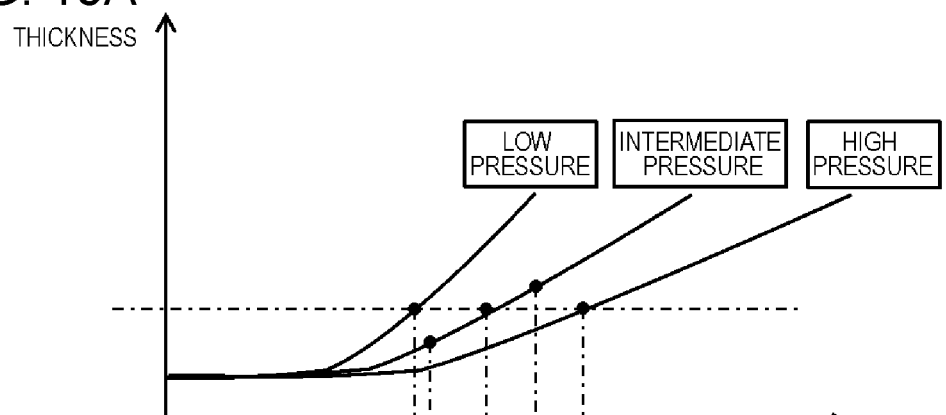
FIG. 13A, FIG. 13B, and FIG. 13C are diagrams showing the relationship between the characteristics of a briquette and an operation parameter.
Figure 13B:
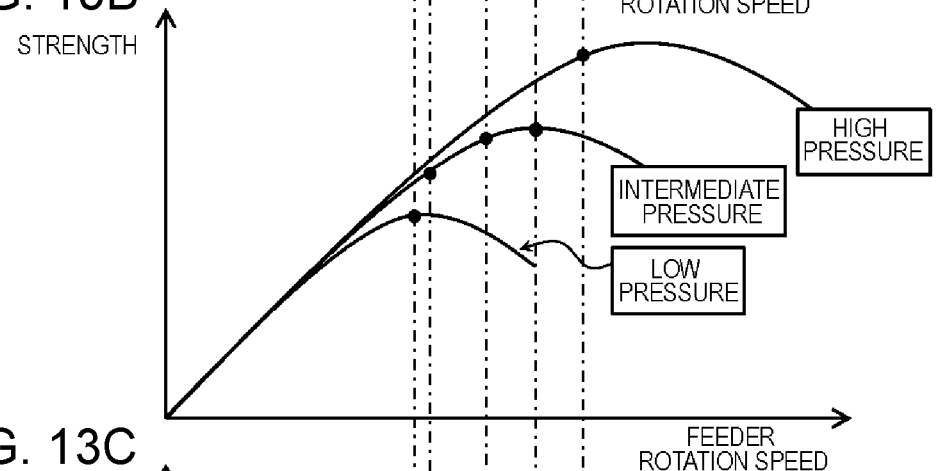
Figure 13C:
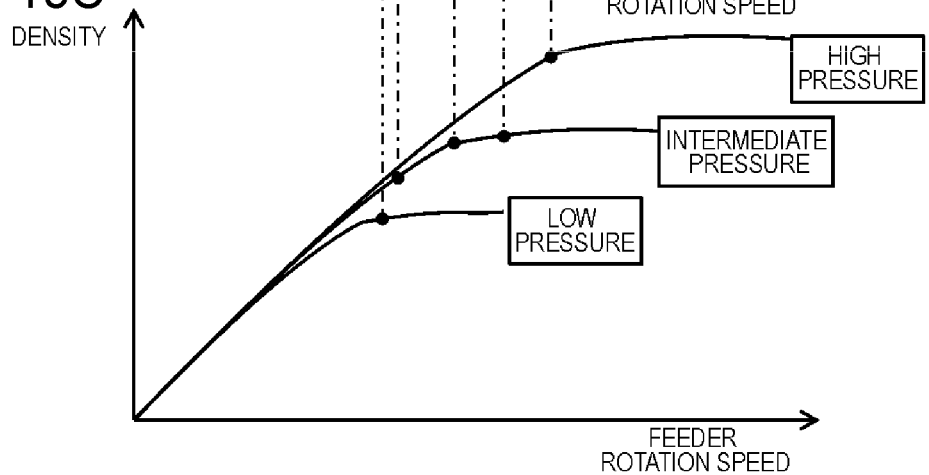

FIG. 13A, FIG. 13B, and FIG. 13C are diagrams showing the relationship between the characteristics of a briquette and of operation parameters. The responsiveness of the compressive strength by adjustment of the feeder rotation speed will be described below. FIG. 13A is a diagram showing the relationship among the feeder rotation speed, the roll pressure, and the thickness of the briquette. FIG. 13B is a diagram showing the relationship among the feeder rotation speed, the roll pressure, and the compressive strength of the briquette. FIG. 13C is a diagram showing the relationship among the feeder rotation speed, the roll pressure, and the apparent density of the briquette. The apparent density refers to the mass per unit volume including the void inside the briquette.

From FIG. 13B, it can be seen that, in a case where the feeder rotation speed is increased at a specific roll pressure, the compressive strength takes a local maximum value at a certain feeder rotation speed. Therefore, it can be seen that, in a range sufficiently away from the local maximum value, it is effective to change the feeder rotation speed in order to adjust the compressive strength, but in the vicinity of the local maximum value, the responsiveness to the compressive strength is poor even if the feeder rotation speed is changed and it is not possible to efficiently adjust the compressive strength. From FIG. 13C, it can be seen that the apparent density is also saturated at a certain feeder rotation speed and the effect of increasing the apparent density is not efficiently obtained even if the feeder rotation speed is further increased. In addition, it can be seen that it is possible to increase the compressive strength or the apparent density exceeding the local maximum value or the saturation value by increasing the roll pressure.

For example, in a case where the strength is close to the local maximum value, the long axis of the probability ellipse becomes large in a graph in which the strength is on the x axis and the unit weight is on the y axis. This is thought to be attributable to the fact that the number of briquettes whose compressive strength is not sufficiently increased even if the unit weight is increased due to the state being close to the local maximum value.

Therefore, in a case where the inclination of the long axis is larger than a specific reference, it can be said that it is effective to adjust the roll pressure or the roll speed rather than adjusting the feeder rotation speed.

Next, the reference F, the lower limit FL, and the upper limit FH relevant to the feeder rotation speed and the reference G relevant to the inclination of the long axis will be described below.

Figure 14A:
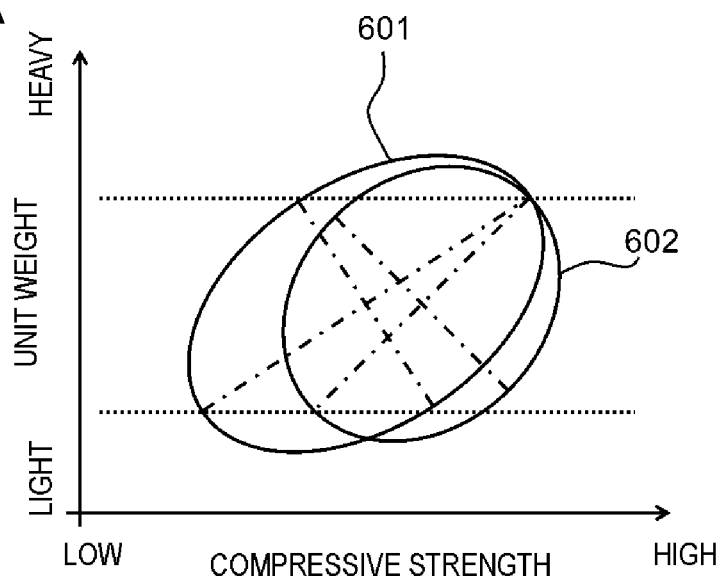
FIG. 14A is a diagram showing an example of the probability ellipse in a case where the compressive strength is on the horizontal axis and the unit weight is on the vertical axis.
Figure 14B:
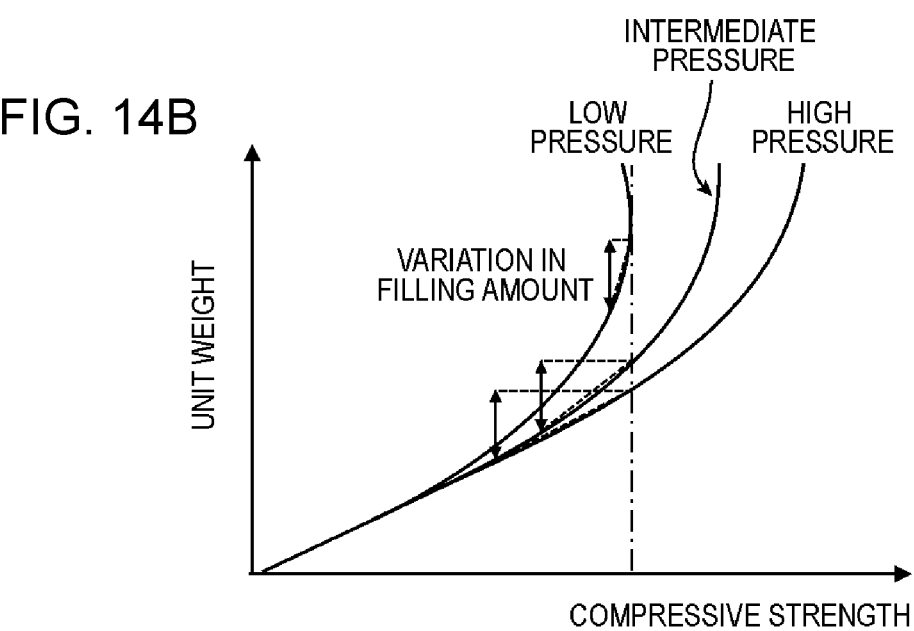
FIG. 14B is a diagram showing the relationship among the compressive strength of the briquette, the unit weight of the briquette, and roll pressure.

FIG. 14A is a diagram showing an example of the probability ellipse in a case where the compressive strength is on the horizontal axis and the unit weight is on the vertical axis. FIG. 14B is a diagram showing the relationship among the compressive strength of the briquette, the unit weight of the briquette, and roll pressure. In order to prevent powdering during transport, it may be preferable to reduce the number of briquettes having a low strength. In this case, it is necessary to avoid that the probability ellipse extends to the side where the compressive strength is low as shown in a probability ellipse 601 in FIG. 14A and the variation in compressive strength becomes large and it is necessary to obtain a distribution that becomes a probability ellipse, such as a probability ellipse 602. As can be seen from FIG. 14B, by manufacturing a briquette under the operating conditions in a range where the compressive strength is saturated or the operating conditions in which the target strength is a saturation value, the influence of a variation in unit weight, that is, a variation in the filling amount of raw material in each briquette, on the compressive strength is reduced. Therefore, it is possible to suppress a variation in compressive strength. Specifically, operating conditions that increase the thickness of the briquette and reduce the roll pressure are suitable. Therefore, it is preferable to set the reference G relevant to the inclination of the long axis to be large and set the reference F, the lower limit FL, and the upper limit FH relevant to the feeder rotation speed to be high.

Figure 15:
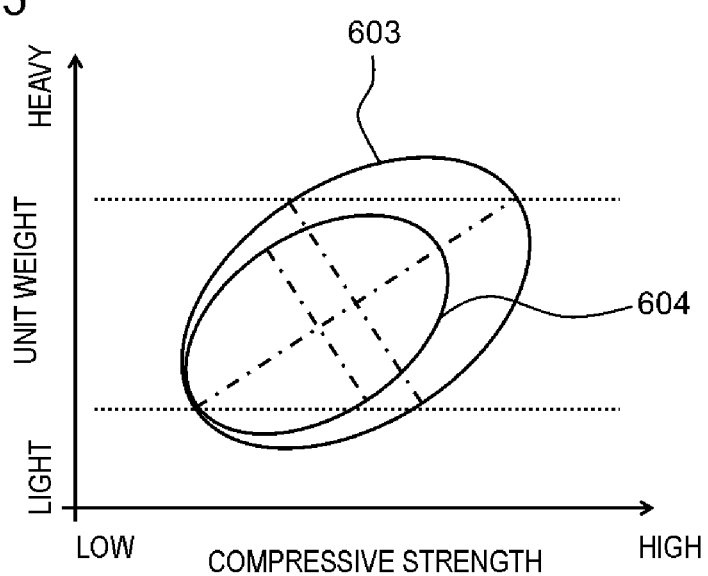
FIG. 15 is a diagram showing another example of the probability ellipse in a case where the compressive strength is on the horizontal axis and the unit weight is on the vertical axis.

FIG. 15 is a diagram showing another example of the probability ellipse in a case where the compressive strength is on the horizontal axis and the unit weight is on the vertical axis. As the quality of the briquette, there is a case where it is desirable to reduce a variation in unit weight. A probability ellipse 604 in this diagram has a smaller variation in unit weight than in the case of a probability ellipse 603. In order to obtain a briquette having such a distribution, there is a method of suppressing the variation in unit weight by making the briquette thin. Specifically, operating conditions that reduce the thickness of the briquette and increase the roll pressure are suitable. Therefore, it is preferable to set the reference G relevant to the inclination of the long axis to be small and set the reference F, the lower limit FL, and the upper limit FH relevant to the feeder rotation speed to be low.

In this manner, by setting the reference according to the desired distribution for each evaluation parameter, it is possible to efficiently manufacture a plurality of briquettes having a desired distribution.

In the above, the case has been described in which the long axis of the probability ellipse rises to the right and the short axis falls to the right in a graph in which the compressive strength increases in the right direction of the axis and the unit weight increases in the upper direction of the axis. For example, in a case where the long axis falls to the right, the operation may be stopped assuming that an abnormality has occurred.

An operation mode corresponding to the desired distribution described above may be prepared, and the values of the reference F, the lower limit FL, the upper limit FH, and the reference G may be switched all at once.

In the method described with reference to the flowchart shown in FIG. 12, a roll load (kN), a roll movement amount, consumption current, or roll pressure may be FB controlled instead of power consumption.

In addition, tumbler strength, drop strength, or density may be used instead of compressive strength. In this manner, it is possible to manufacture a briquette satisfying a desired reference for each of these characteristics.

In the method described with reference to the flowchart shown in FIG. 12, some of the steps may be appropriately omitted.

According to the briquetting machine 10 of the present embodiment, it is possible to bring two evaluation parameters close to the target values while keeping a balance between the two evaluation parameters for the characteristics of the briquette.

Fourth Embodiment

A briquetting machine 10 according to the present embodiment is the same as the briquetting machine 10 according to the third embodiment except for the points described below. In the briquetting machine 10 according to the present embodiment, the first evaluation parameter is the apparent density of the briquette, and the second evaluation parameter is any of the compressive strength, tumbler strength, and drop strength of the briquette. Detailed explanation thereof will be given below.

Figure 16:
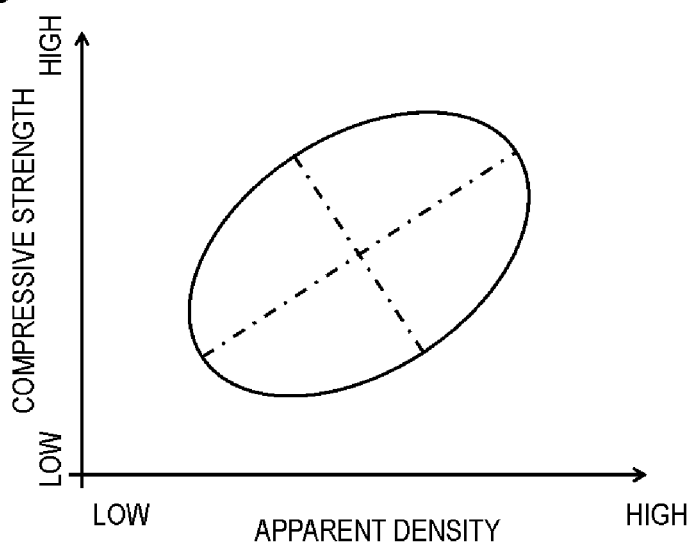
FIG. 16 is a diagram showing an example of the probability ellipse according to a fourth embodiment.

FIG. 16 is a diagram showing an example of the probability ellipse according to the present embodiment. In the present embodiment, in the setting step (step S50), in a case where the evaluation value is the length of the long axis, the setting unit 450 determines whether or not to change the raw material supply amount per unit time of the raw material supply unit 130 as an operation parameter.

A case will be described below in which the long axis of the probability ellipse rises to the right and the short axis falls to the right in a graph in which the apparent density increases in the right direction of the x axis and the compressive strength increases in the upper direction of the y axis. For example, in a case where the long axis falls to the right, the operation may be stopped assuming that an abnormality has occurred.

In the following explanation, a reference used for each determination of the setting unit 450 is held in the storage unit 440 in advance, and can be read and acquired by the setting unit 450.

The setting unit 450 can repeat the determination regarding whether or not to change the operating conditions, for example, at predetermined time intervals. Alternatively, the acquisition unit 430 may acquire evaluation information according to a predetermined operation (operation as a trigger for acquiring information) that the user performs on the briquetting machine 10 or the like, and the setting unit 450 may determine whether or not to change the operating conditions.

In a case where the first evaluation parameter is set to the apparent density (hereinafter, simply referred to as "density") of the briquette and the second evaluation parameter is any (hereinafter, simply referred to as "strength") of the compressive strength, tumbler strength, and drop strength of the briquette as described above, a variation in the degree of solidification increases as the length of the long axis increases. In addition, it is presumed that a variation in force applied to the raw material is large since a briquette, for which the raw material supply amount is not sufficient, is mixed. Therefore, in a case where the evaluation value is the length of the long axis, the setting unit 450 determines whether or not to change the raw material supply amount per unit time of the raw material supply unit 130 as an operation parameter. Specifically, in a case where the length of the long axis is larger than a predetermined reference value, the setting unit 450 adjusts the operating conditions so as to increase the feeder rotation speed. On the other hand, in a case where the length of the long axis is not larger than the predetermined reference value, the feeder rotation speed is not changed.

The setting unit 450 may determine whether or not to change the roll movement amount instead of the raw material supply amount per unit time of the raw material supply unit 130 as an operation parameter in a case where the evaluation value is the length of the long axis. In this case, specifically, in a case where the length of the long axis is larger than the predetermined reference value, the setting unit 450 adjusts the operating conditions so as to increase the roll movement amount (distance between the two rolls 120). On the other hand, in a case where the length of the long axis is not larger than the predetermined reference value, the roll movement amount is not changed. The roll movement amount may be FB controlled instead of the power consumption of the second embodiment so as to be kept at a set value by adjusting the feeder rotation speed, for example.

According to the briquetting machine 10 of the present embodiment, since the first evaluation parameter is the apparent density of the briquette and the second evaluation parameter is any of the compressive strength, tumbler strength, and drop strength of the briquette, it is possible to easily obtain a briquette having target density and strength.

A first modification example of the briquetting machine 10 according to the present embodiment will be described. In this modification example, in the setting step (step S50), in a case where the evaluation value is the length of the short axis, the setting unit 450 determines whether or not to change at least one of the distance between the two rolls 120 and the pressure, which is applied to the raw material located between the two rolls 120 through the two rolls 120, as operation parameters.

A variation in the amount of defects (voids) in the briquette increases as the length of the short axis increases in the probability ellipse. In addition, it is presumed that internal breaking occurs due to too high pressure applied to the raw material. Therefore, the setting unit 450 determines whether or not to change the roll pressure as an operation parameter in a case where the evaluation value is the length of the short axis. Specifically, in a case where the length of the short axis is larger than the predetermined reference value, the setting unit 450 adjusts the operating conditions so as to reduce the roll pressure. On the other hand, in a case where the length of the short axis is not larger than the predetermined reference, the setting unit 450 does not change the roll pressure.

A second modification example of the briquetting machine 10 according to the present embodiment will be described. In this modification example, in the setting step (step S50), in a case where the evaluation value is the inclination of the long axis, the setting unit 450 determines whether or not to change the pressure, which is applied to the raw material located between the two rolls 120 through the two rolls 120, as an operation parameter.

The response of the strength change with respect to the increase in density becomes poor as the inclination of the long axis decreases in the probability ellipse. It is presumed that the force applied to the raw material becomes weak due to too large raw material supply amount, wear of the roll 120, or the like. In addition, since a rise in strength with respect to the rise in density is small, it is presumed that the effect is small with the adjustment to increase the feeder rotation speed. Therefore, the setting unit 450 determines whether or not to change the roll pressure as an operation parameter in a case where the evaluation value is the inclination of the long axis. Specifically, in a case where the inclination of the long axis is smaller than the predetermined reference value, the setting unit 450 adjusts the operating conditions so as to increase the roll pressure. On the other hand, in a case where the inclination of the long axis is not smaller than the predetermined reference, the setting unit 450 does not change the roll pressure.

In a case where the inclination of the long axis is smaller than the predetermined reference value, the setting unit 450 may output a signal for displaying letters or the like prompting the replacement of the roll 120 on a display unit (not shown in the drawings). This is because the wear of the roll is presumed as described above. In accordance with or instead of the above, a signal for displaying letters or the like prompting the user to check whether or not lateral leakage of powder in a roll portion has occurred on the display unit may be output.

In a case where the length of at least one of the long axis and the short axis is larger than the predetermined reference value, the setting unit 450 may output a signal for displaying letters or the like prompting the replacement of the roll 120 on a display unit (not shown in the drawings). Also in these cases, this is because the wear of the roll 120 is presumed.

A third modification example of the briquetting machine 10 according to the present embodiment will be described. In this modification example, in the setting step (step S50), in a case where the evaluation value is the area of the probability ellipse, the setting unit 450 determines whether or not to change at least one of the feeder rotation speed and the roll pressure as operation parameters.

This means that a variation in the quality of the briquette with respect to the density and strength increases as the area increases in the probability ellipse. In addition, it is thought that the area can be reduced by reducing each of the length of the long axis and the length of the short axis. Accordingly, in a case where the area of the probability ellipse is larger than the predetermined reference value, the setting unit 450 determines that at least one of the feeder rotation speed and the roll pressure as operation parameters is to be changed. In addition, it is determined whether or not each of the lengths of the long axis and the short axis is larger than the predetermined reference value. In a case where the length of the long axis is larger than the predetermined reference value, the operating conditions are adjusted so as to increase the feeder rotation speed. In a case where the length of the long axis is not larger than the predetermined reference, the setting unit 450 does not change the feeder rotation speed. In a case where the length of the short axis is larger than the predetermined reference, the setting unit 450 adjusts the operating conditions so as to reduce the roll pressure. In a case where the length of the short axis is not larger than the predetermined reference, the setting unit 450 does not change the roll pressure.

In this manner, it is possible to stably manufacture briquettes with small variations in density and strength.

In this modification example, as described in the first modification example, the roll movement amount may be adjusted instead of the feeder rotation speed.

A fourth modification example of the briquetting machine 10 according to the present embodiment will be described. In this modification example, in a case where the evaluation value is the center coordinates of the probability ellipse, the setting unit 450 determines whether or not to change at least one of the feeder rotation speed and the roll pressure as operation parameters.

The average value of the characteristics of the briquette is not the target value in a case where the center coordinates deviate from the target point in the probability ellipse. The setting unit 450 determines whether or not the center coordinates are within the reference range including the target point. In a case where the center coordinates are within the reference range, the setting unit 450 does not change the operating conditions.

On the other hand, in a case where the center coordinates are not within the reference range, the setting unit 450 determines that at least one of the feeder rotation speed and the roll pressure is to be changed, and further determines whether or not an angle between the line segment connecting the acquired center coordinates and the target point to each other and the long axis of the probability ellipse is smaller than the reference. In a case where the angle is smaller than the predetermined reference, it can be said that the target point deviates mainly in the long axis direction of the probability ellipse with respect to the center coordinates, and both the strength and the density can be brought close to the target point. In this case, the setting unit 450 changes the feeder rotation speed so that the center coordinates approach the target point. Specifically, in a case where the x coordinate of the center coordinates is smaller than the x coordinate of the target point, the feeder rotation speed is changed so as to be increased by a predetermined specific width. On the other hand, in a case where the x coordinate of the center coordinates is larger than the x coordinate of the target point, the feeder rotation speed is changed so as to be reduced by a predetermined specific width.

On the other hand, as a result of determining whether or not the angle between the line segment connecting the acquired center coordinates and the target point to each other and the long axis of the probability ellipse is smaller than the reference, in a case where the angle is not smaller than the predetermined reference, it can be said that the target point deviates in a direction perpendicular to the long axis of the probability ellipse with respect to the center coordinates. Therefore, the setting unit 450 changes the roll pressure so that the center coordinates approach the target point. Specifically, in a case where the y coordinate of the center coordinates is smaller than the y coordinate of the target point, the roll pressure is changed so as to be increased by a predetermined specific width. On the other hand, in a case where the y coordinate of the center coordinates is larger than the y coordinate of the target point, the roll pressure is changed so as to be reduced by a predetermined specific width.

By repeating the method described above, it is thought that the center coordinates approach the target point as follows. For example, in a case where it is first determined that the angle is not smaller than the predetermined reference, the roll pressure is changed. Accordingly, as the center coordinates approach the target point, it is thought that the angle becomes small. Then, in a case where it is determined that the angle is smaller than the reference, the feeder rotation speed is changed, and the angle becomes large again. Then, in a case where it is determined that the angle is not smaller than the reference, the roll pressure is changed. Thus, the center coordinates approach the target point while changing the roll pressure and changing the feeder rotation speed are repeated.

In the method described above, in a case where the angle is not smaller than the predetermined reference, the setting unit 450 may acquire a predetermined evaluation parameter to be prioritized between the first and second evaluation parameters from the storage unit 440, and may change any of the feeder rotation speed and the roll pressure so that the evaluation parameter is brought close to the target point. In this manner, it is possible to bring a parameter to be prioritized to a desired value more rapidly.

In this manner, it is possible to stably manufacture briquettes with desired density and strength.

The setting unit 450 may perform two or more of the adjustments of the operating conditions according to the present embodiment, the first modification example, the second modification example, the third modification example, the fourth modification example, and the third embodiment in parallel. These adjustments may be appropriately switched.

Next, the operation and effect of the present embodiment will be described. In the present embodiment, the same operation and effect as in the third embodiment can be obtained.

Fifth Embodiment

Figure 17:
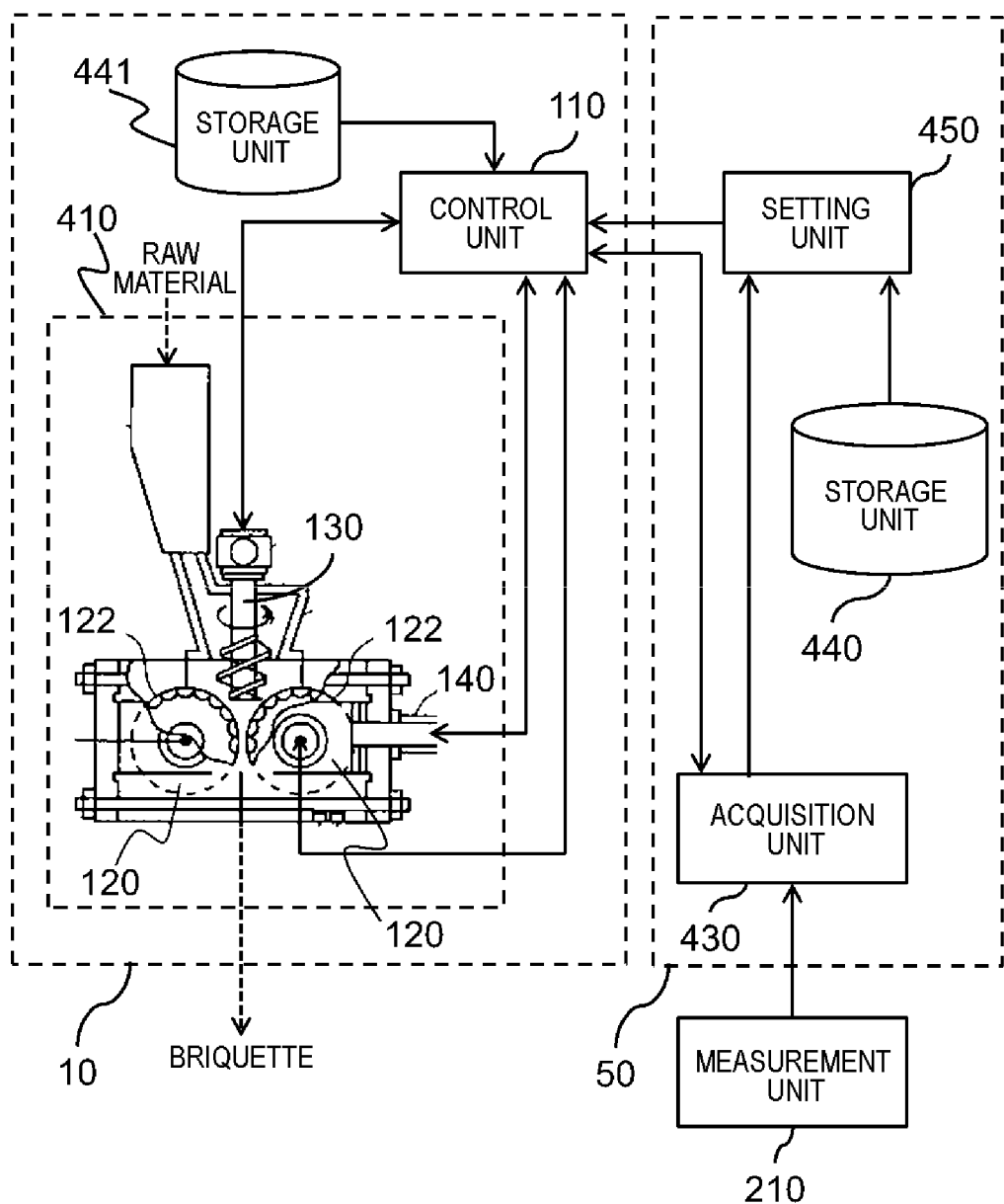
FIG. 17 is a block diagram showing the configuration and use environment of a control device of a briquetting machine according to a fifth embodiment.

FIG. 17 is a block diagram showing the configuration and use environment of a control device 50 of the briquetting machine according to the present embodiment. The control device 50 is a control device of the briquetting machine 10 that operates under the set operating conditions to manufacture briquettes. The control device 50 includes an acquisition unit 430 and a setting unit 450. The acquisition unit 430 acquires evaluation information indicating the evaluation results of a plurality of briquettes manufactured under the same manufacturing conditions. The setting unit 450 sets the operating conditions based on the evaluation information. The evaluation information includes a first evaluation parameter and a second evaluation parameter. The setting unit 450 determines whether or not to change predetermined operating conditions by comparing an evaluation value, which is based on the distribution of a plot in the case of plotting the evaluation results of a plurality of briquettes on a graph in which the first evaluation parameter is on the first axis and the second evaluation parameter is on the second axis, with a predetermined reference. Detailed explanation thereof will be given below.

The control device 50 controls the briquetting machine 10 so as to manufacture a briquette using any of the methods described in the second to fourth embodiments.

The acquisition unit 430 and the setting unit 450 according to the present embodiment have the same configuration as the acquisition unit 430 and the setting unit 450 according to any of the second to fourth embodiments. The briquetting machine 10 includes a granulation unit 410 and a control unit 110. The configuration of the granulation unit 410 and the control unit 110 according to the present embodiment is the same as the configuration of the granulation unit 410 and the control unit 110 according to the second or third embodiment. The briquetting machine 10 and the control device 50 include a storage unit 440 and a storage unit 441, respectively.

In the control device 50 according to the present embodiment, the following manufacturing method of the briquetting machines is realized. That is, the control method is a control method of a briquetting machine that operates under the set operating conditions to manufacture briquettes, and includes an acquisition step and a setting step. In the acquisition step, evaluation information indicating the evaluation results of a plurality of briquettes manufactured under the same manufacturing conditions is acquired. In the setting step, the operating conditions are set based on the evaluation information. The evaluation information includes a first evaluation parameter and a second evaluation parameter. In the setting step, it is determined whether or not to change predetermined operating conditions by comparing an evaluation value, which is based on the distribution of a plot in the case of plotting the evaluation results of a plurality of briquettes on a graph in which the first evaluation parameter is on the first axis and the second evaluation parameter is on the second axis, with a predetermined reference.

In addition, the control device 50 may be a device integrated with a measurement unit 210 that measures the evaluation results of a plurality of briquettes manufactured under the same manufacturing conditions.

According to the control device 50 of the briquetting machine according to the present embodiment, it is possible to obtain the same operation and effect as in the third or fourth embodiment.

While the embodiments of the present invention have been described with reference to the diagrams, these are only illustration of the present invention, and other various configurations can also be adopted.

Hereinafter, examples of reference forms are additionally written.

1. A briquetting machine, comprising: a granulation unit that operates under set operating conditions to manufacture briquettes; an acquisition unit that acquires evaluation information indicating evaluation results of the plurality of briquettes manufactured under the same manufacturing conditions; a setting unit that sets the operating conditions based on the evaluation information; and a storage unit that stores comparison data indicating a relationship between comparison evaluation information, which is the evaluation information to be compared, and comparison operating conditions, which are the operating conditions when the comparison evaluation information is obtained, wherein the setting unit adjusts the operating conditions based on the evaluation information acquired by the acquisition unit and the comparison data.

2. The briquetting machine according to 1, wherein the operating conditions include a plurality of operation parameters, and the setting unit specifies the operation parameter to be adjusted and calculates the adjustment amount of the operation parameter based on the evaluation information and the comparison data.

3. The briquetting machine according to 1 or 2, wherein the granulation unit includes two rolls facing each other and a raw material supply unit that supplies a raw material between the two rolls, a recessed portion is formed on at least one of surfaces of the two rolls, and the operating conditions include two or more of a rotation speed of each of the two rolls, pressure applied to the raw material located between the two rolls through the two rolls, and a raw material supply amount per unit time of the raw material supply unit.

4. The briquetting machine according to any one of 1 to 3, wherein the evaluation information includes at least one of center coordinates, a length of a long axis, a length of a short axis, an inclination of the long axis, and an area of a probability ellipse in a case of plotting the evaluation results of the briquettes on a plane in which a first evaluation parameter of the briquettes is defined as an x axis and a second evaluation parameter of the briquettes is defined as a y axis.

5. A method of manufacturing briquettes using a briquetting machine, comprising: acquiring evaluation information indicating evaluation results of the plurality of briquettes manufactured under the same manufacturing conditions; acquiring comparison data indicating a relationship between comparison evaluation information, which is the evaluation information to be compared, and comparison operating conditions, which are the operating conditions when the comparison evaluation information is obtained; and adjusting the operating conditions based on the evaluation information and the comparison data.

This application claims priority from Japanese Patent Application No. 2014-216163, filed on Oct. 23, 2014, the entire contents of which are incorporated herein.

The invention claimed is:

1. A briquetting machine, comprising:
a granulation unit that operates under set operating conditions to manufacture briquettes;
an acquisition unit that acquires evaluation information indicating evaluation results of the plurality of briquettes manufactured under the same manufacturing conditions; and
a setting unit that sets the operating conditions based on the evaluation information,
wherein in the evaluation information, values of a plurality of measured evaluation parameters are associated with each briquette,
the plurality of evaluation parameters include a first evaluation parameter and a second evaluation parameter,
the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference,
the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis,
the granulation unit includes two rolls facing each other and a raw material supply unit that supplies a raw material between the two rolls,
a recessed portion for manufacturing the briquette is formed on at least one of surfaces of the two rolls,
the first evaluation parameter is an apparent density of the briquette, and the second evaluation parameter is any of a compressive strength, a tumbler strength, and a drop strength of the briquette,
the setting unit determines whether or not to change a raw material supply amount per unit time of the raw material supply unit as the operation parameter in a case where the evaluation value is the length of the long axis, and
in a case where the length of the long axis is larger than the predetermined reference, the setting unit adjusts the operating conditions so as to increase the raw material supply amount, and in a case where the length of the long axis is not larger than the predetermined reference, the setting unit does not change the raw material supply amount.

2. A briquetting machine, comprising:
a granulation unit that operates under set operating conditions to manufacture briquettes;
an acquisition unit that acquires evaluation information indicating evaluation results of the plurality of briquettes manufactured under the same manufacturing conditions; and
a setting unit that sets the operating conditions based on the evaluation information,
wherein in the evaluation information, values of a plurality of measured evaluation parameters are associated with each briquette,
the plurality of evaluation parameters include a first evaluation parameter and a second evaluation parameter,
the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference,
the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis,
the granulation unit includes two rolls facing each other and a raw material supply unit that supplies a raw material between the two rolls,
a recessed portion for manufacturing the briquette is formed on at least one of surfaces of the two rolls,
the first evaluation parameter is an apparent density of the briquette, and the second evaluation parameter is any of a compressive strength, a tumbler strength, and a drop strength of the briquette,
the setting unit determines whether or not to change pressure, which is applied to a raw material located between the two rolls through the two rolls, as the operation parameter in a case where the evaluation value is the length of the short axis, and
in a case where the length of the short axis is larger than the predetermined reference, the setting unit adjusts the operating conditions so as to reduce the pressure, and in a case where the length of the short axis is not larger than the predetermined reference, the setting unit does not change the pressure.

3. A briquetting machine, comprising:
a granulation unit that operates under set operating conditions to manufacture briquettes;
an acquisition unit that acquires evaluation information indicating evaluation results of the plurality of briquettes manufactured under the same manufacturing conditions; and
a setting unit that sets the operating conditions based on the evaluation information,
wherein in the evaluation information, values of a plurality of measured evaluation parameters are associated with each briquette,
the plurality of evaluation parameters include a first evaluation parameter and a second evaluation parameter,
the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference,
the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis,
the granulation unit includes two rolls facing each other and a raw material supply unit that supplies a raw material between the two rolls,
a recessed portion for manufacturing the briquette is formed on at least one of surfaces of the two rolls,
the first evaluation parameter is an apparent density of the briquette, and the second evaluation parameter is any of a compressive strength, a tumbler strength, and a drop strength of the briquette,
the setting unit determines whether or not to change pressure, which is applied to a raw material located between the two rolls through the two rolls, as the operation parameter in a case where the evaluation value is the inclination of the long axis, and
in a case where the inclination of the long axis is smaller than the predetermined reference, the setting unit adjusts the operating conditions so as to increase the pressure, and in a case where the inclination of the long axis is not smaller than the predetermined reference, the setting unit does not change the pressure.

4. A briquetting machine, comprising:
a granulation unit that operates under set operating conditions to manufacture briquettes;
an acquisition unit that acquires evaluation information indicating evaluation results of the plurality of briquettes manufactured under the same manufacturing conditions; and
a setting unit that sets the operating conditions based on the evaluation information,
wherein in the evaluation information, values of a plurality of measured evaluation parameters are associated with each briquette,
the plurality of evaluation parameters include a first evaluation parameter and a second evaluation parameter,
the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference,
the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis,
the granulation unit includes two rolls facing each other and a raw material supply unit that supplies a raw material between the two rolls,
a recessed portion for manufacturing the briquette is formed on at least one of surfaces of the two rolls,
the first evaluation parameter is any of a compressive strength, a tumbler strength, and a drop strength of the briquette, and the second evaluation parameter is a unit weight of the briquette,
the setting unit determines whether or not to change at least one of a rotation speed of each of the two rolls and pressure, which is applied to a raw material located between the two rolls through the two rolls, as the operation parameters in a case where the evaluation value is the inclination of the long axis, and
in a case where the inclination of the long axis is larger than the predetermined reference, the setting unit adjusts the operating conditions so as to reduce the rotation speed or increase the pressure, and in a case where the inclination of the long axis is equal or smaller than the predetermined reference and a raw material supply amount per unit time of the raw material supply unit is not an upper limit, the setting unit changes neither the rotation speed nor the pressure.

5. A control device of a briquetting machine that operates under set operating conditions to manufacture briquettes, comprising:
an acquisition unit that acquires evaluation information indicating evaluation results of the plurality of briquettes manufactured under the same manufacturing conditions; and
a setting unit that sets the operating conditions based on the evaluation information,
wherein in the evaluation information, values of a plurality of measured evaluation parameters are associated with each briquette,
the plurality of evaluation parameters include a first evaluation parameter and a second evaluation parameter,
the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference,
the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis, the briquetting machine includes two rolls facing each other and a raw material supply unit that supplies a raw material between the two rolls, a recessed portion for manufacturing the briquette is formed on at least one of surfaces of the two rolls, the first evaluation parameter is an apparent density of the briquette, and the second evaluation parameter is any of a compressive strength, a tumbler strength, and a drop strength of the briquette, the setting unit determines whether or not to change a raw material supply amount per unit time of the raw material supply unit as the operation parameter in a case where the evaluation value is the length of the long axis, and in a case where the length of the long axis is larger than the predetermined reference, the setting unit adjusts the operating conditions so as to increase the raw material supply amount, and in a case where the length of the long axis is not larger than the predetermined reference, the setting unit does not change the raw material supply amount.

6. A control method of a briquetting machine that operates under set operating conditions to manufacture briquettes by the control device according to claim 5, comprising:

an acquisition step of acquiring evaluation information indicating evaluation results of the plurality of briquettes manufactured under the same manufacturing conditions; and a setting step of setting the operating conditions based on the evaluation information, wherein the evaluation information includes a first evaluation parameter and a second evaluation parameter, and in the setting step, whether or not to change the operating conditions set in advance is determined by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

7. A method of manufacturing briquettes using the briquetting machine according to claim 1, comprising:

an acquisition step of acquiring evaluation information indicating evaluation results of the plurality of briquettes manufactured under the same manufacturing conditions; and a setting step of setting the operating conditions based on the evaluation information, wherein the evaluation information includes a first evaluation parameter and a second evaluation parameter, and in the setting step, whether or not to change the operating conditions set in advance is determined by comparing an evaluation value, which is based on a distribution of a plot in a case of plotting the evaluation results of the plurality of briquettes on a graph in which a first evaluation parameter is on a first axis and a second evaluation parameter is on a second axis, with a predetermined reference.

8. A control device of a briquetting machine that operates under set operating conditions to manufacture briquettes, comprising:

an acquisition unit that acquires evaluation information indicating evaluation results of the plurality of briquettes manufactured under the same manufacturing conditions; and a setting unit that sets the operating conditions based on the evaluation information, wherein in the evaluation information, values of a plurality of measured evaluation parameters are associated with each briquette, the plurality of evaluation parameters include a first evaluation parameter and a second evaluation parameter, the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference, the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis, the briquetting machine includes two rolls facing each other and a raw material supply unit that supplies a raw material between the two rolls, a recessed portion for manufacturing the briquette is formed on at least one of surfaces of the two rolls, the first evaluation parameter is an apparent density of the briquette, and the second evaluation parameter is any of a compressive strength, a tumbler strength, and a drop strength of the briquette, the setting unit determines whether or not to change pressure, which is applied to a raw material located between the two rolls through the two rolls, as the operation parameter in a case where the evaluation value is the length of the short axis, and in a case where the length of the short axis is larger than the predetermined reference, the setting unit adjusts the operating conditions so as to reduce the pressure, and in a case where the length of the short axis is not larger than the predetermined reference, the setting unit does not change the pressure.

9. A control device of a briquetting machine that operates under set operating conditions to manufacture briquettes, comprising:

an acquisition unit that acquires evaluation information indicating evaluation results of the plurality of briquettes manufactured under the same manufacturing conditions; and a setting unit that sets the operating conditions based on the evaluation information, wherein in the evaluation information, values of a plurality of measured evaluation parameters are associated with each briquette, the plurality of evaluation parameters include a first evaluation parameter and a second evaluation parameter, the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference, the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis, the briquetting machine includes two rolls facing each other and a raw material supply unit that supplies a raw material between the two rolls, a recessed portion for manufacturing the briquette is formed on at least one of surfaces of the two rolls, the first evaluation parameter is an apparent density of the briquette, and the second evaluation parameter is any of a compressive strength, a tumbler strength, and a drop strength of the briquette, the setting unit determines whether or not to change pressure, which is applied to a raw material located between the two rolls through the two rolls, as the operation parameter in a case where the evaluation value is the inclination of the long axis, and in a case where the inclination of the long axis is smaller than the predetermined reference, the setting unit adjusts the operating conditions so as to increase the pressure, and in a case where the inclination of the long axis is not smaller than the predetermined reference, the setting unit does not change the pressure.

10. A control device of a briquetting machine that operates under set operating conditions to manufacture briquettes, comprising:

an acquisition unit that acquires evaluation information indicating evaluation results of the plurality of briquettes manufactured under the same manufacturing conditions; and a setting unit that sets the operating conditions based on the evaluation information, wherein in the evaluation information, values of a plurality of measured evaluation parameters are associated with each briquette, the plurality of evaluation parameters include a first evaluation parameter and a second evaluation parameter, the setting unit determines whether or not to change the operating conditions set in advance by comparing an evaluation value, which is based on a distribution of a plot in a case of plotting the evaluation results of the plurality of briquettes on a graph in which the first evaluation parameter is on a first axis and the second evaluation parameter is on a second axis, with a predetermined reference, the evaluation value includes at least one of a length of a long axis, a length of a short axis, and an inclination of the long axis of a probability ellipse in the case of plotting the evaluation results of the plurality of briquettes on the graph in which the first evaluation parameter is on the first axis and the second evaluation parameter is on the second axis, the briquetting machine includes two rolls facing each other and a raw material supply unit that supplies a raw material between the two rolls, a recessed portion for manufacturing the briquette is formed on at least one of surfaces of the two rolls, the first evaluation parameter is any of a compressive strength, a tumbler strength, and a drop strength of the briquette, and the second evaluation parameter is a unit weight of the briquette, the setting unit determines whether or not to change at least one of a rotation speed of each of the two rolls and pressure, which is applied to a raw material located between the two rolls through the two rolls, as the operation parameters in a case where the evaluation value is the inclination of the long axis, and in a case where the inclination of the long axis is larger than the predetermined reference, the setting unit adjusts the operating conditions so as to reduce the rotation speed or increase the pressure, and in a case where the inclination of the long axis is equal or smaller than the predetermined reference and a raw material supply amount per unit time of the raw material supply unit is not an upper limit, the setting unit changes neither the rotation speed nor the pressure.

* * * * *